United States Patent
Jovicic et al.

(10) Patent No.: US 9,520,939 B2
(45) Date of Patent: Dec. 13, 2016

(54) METHODS AND APPARATUS FOR USING VISIBLE LIGHT COMMUNICATIONS FOR CONTROLLING ACCESS TO AN AREA

(71) Applicant: QUALCOMM Incorporated, San Diego, CA (US)

(72) Inventors: Aleksandar Jovicic, Jersey City, NJ (US); Ivan Klimek, Ganovce (SK); Thomas Joseph Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 13/787,676

(22) Filed: Mar. 6, 2013

(65) Prior Publication Data
US 2014/0255036 A1    Sep. 11, 2014

(51) Int. Cl.
*H04B 10/116* (2013.01)
*G07C 9/00* (2006.01)

(52) U.S. Cl.
CPC ......... *H04B 10/116* (2013.01); *G07C 9/00309* (2013.01); *G07C 9/00571* (2013.01); *G07C 2009/00785* (2013.01)

(58) Field of Classification Search
CPC  H04B 10/116; G07C 9/00571; G07C 9/00309
(Continued)

(56) References Cited

U.S. PATENT DOCUMENTS 4,811,897 A * 3/1989 Kobayashi ............... F24F 3/00
165/217

7,196,610 B2 * 3/2007 Straumann et al. ......... 340/5.61
(Continued)

FOREIGN PATENT DOCUMENTS

| CN | 101135208 A | 3/2008 |
| CN | 101246607 A | 8/2008 |
| CN | 102646295 A | 8/2012 |

OTHER PUBLICATIONS

ISA/EPO, International Search Report and Written Opinion of the International Searching Authority, Int'l App. No. PCT/US2014/019280, Jun. 27, 2014, European Patent Office, Rijswijk, NL, 11 pgs.

*Primary Examiner* — Jennifer Mehmood
*Assistant Examiner* — Yong Hang Jiang
(74) *Attorney, Agent, or Firm* — Holland & Hart LLP

(57) ABSTRACT

Methods and apparatus for controlling access to secure areas are described. Time varying values are generated from access device identifiers, e.g., door identifiers. The time varying value, e.g., a hashed door identifier value, is transmitted as a VLC signal by a luminaire near the door to which the hashed identifier corresponds. A mobile detects the transmitted hashed door identifier value and sends an access request via a wireless signal, e.g., a radio signal. The access request includes a value generated from the received hashed door identifier and a mobile device identifier. A control device determines, from information in the access request and stored information indicating which mobile devices have authority to access which doors, if access should be granted to the door corresponding to the hashed access device identifier from which the received information was generated. The received information may be hash of the mobile identifier and hashed door identifier.

16 Claims, 13 Drawing Sheets

(58) Field of Classification Search
    USPC .................. 340/5.7, 5.72, 12.32, 12, 33,
                                      12.34,340/12.35, 12.04
    See application file for complete search history.

(56) References Cited

U.S. PATENT DOCUMENTS

| | | |
|---|---|---|
| 7,243,233 B2 | 7/2007 | Kindberg et al. |
| 7,958,359 B2 | 6/2011 | Sharma et al. |
| 8,040,216 B2 | 10/2011 | Jordan et al. |
| 8,160,548 B2 | 4/2012 | Aaron |
| 8,214,899 B2* | 7/2012 | Chien .......................... 726/23 |
| 8,334,901 B1 | 12/2012 | Ganick et al. |
| 2003/0128101 A1 | 7/2003 | Long |
| 2004/0049675 A1 | 3/2004 | Micali et al. |
| 2005/0068151 A1* | 3/2005 | Ushida .................. G08C 19/28 340/3.71 |
| 2006/0255908 A1* | 11/2006 | Gilbert et al. ............... 340/5.61 |
| 2007/0168674 A1 | 7/2007 | Nonaka et al. |
| 2008/0055041 A1 | 3/2008 | Takene et al. |
| 2008/0267407 A1* | 10/2008 | Vanderveen .................. 380/277 |
| 2013/0043973 A1 | 2/2013 | Greisen et al. |
| 2013/0227647 A1* | 8/2013 | Thomas .............. H04L 63/0823 726/3 |

* cited by examiner

| IDENTIFIER ↓302 | ACCESS DEVICE(AD), E.G., DOOR, NUMBER ↓304 | REPRESENTATIVE LIGHTING DEVICE NUMBER ↓306 |
|---|---|---|
| 00:19:47:FF:1D:2E | AD1 | L1 |
| 00:1A:C3:32:B9:6A | AD5 | L15 |
| 00:1A:C3:FE:85:6E | AD23 | L30 |
| 00:1A:C2:29:D6:B4 | AD24 | L42 |
| 00:1B:D7:B4:7D:1C | AD40 | L50 |
| ⋮ | ⋮ | ⋮ |
| 00:1C:D5:B4:7D:1E | AD N | L N |

FIGURE 3

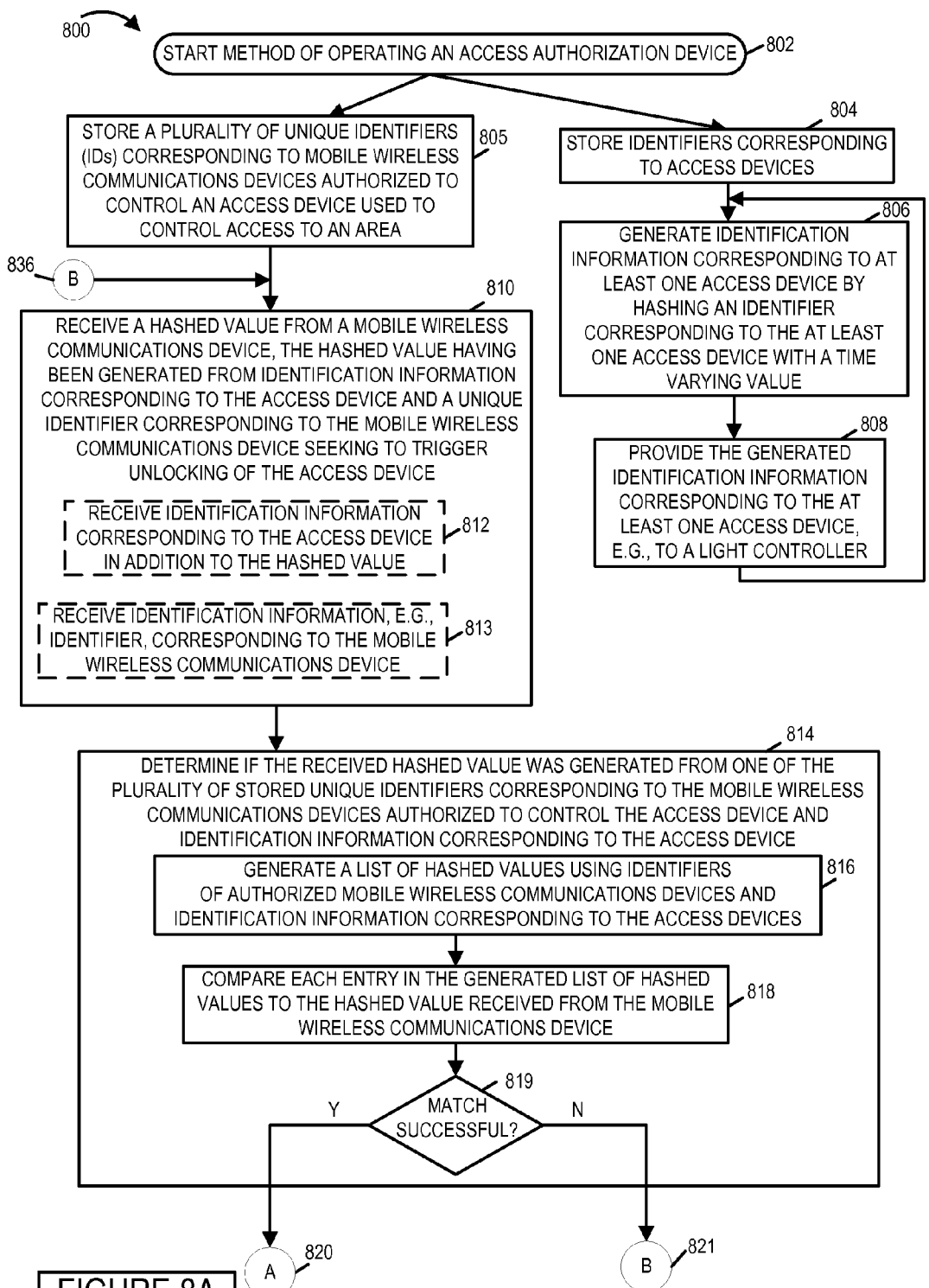

| FIGURE 10A |
| FIGURE 10B |

| ACCESS INFORMATION | | | | |
|---|---|---|---|---|
| ACCESS DEVICE, E.G., DOOR, NUMBER (1102) | IDENTIFIER (1104) | CORRESPONDING ACCESS ID HASHED VALUES (H1) AND VALIDITY TIME PERIOD (1106) | | AUTHORIZED MOBILE DEVICE IDENTIFIERS (MID) (1112) | GENERATED AUTHENTICATION HASHED VALUES (H2) (1114) |
| | | VALUE (1108) | TIME PERIOD (1110) | | |
| AD1 (1120) | 00:19:47:FF:1D:2E | $H1_{AD1}$ | T1 | M1 | $H2_{M1D1}$ |
| | | | | M2 | $H2_{M2D1}$ |
| | | | | : | : |
| | | | | ML | $H2_{MLD1}$ |
| | | $H1'_{AD1}$ | T2 | M1 | $H2'_{M1D1}$ |
| | | | | M2 | $H2'_{M2D1}$ |
| | | | | : | : |
| | | | | ML | $H2'_{MLD1}$ |
| AD2 (1122) | 00:1A:C3:32:B9:6A | $H1_{AD2}$ | T1 | M1 | $H2_{M1D2}$ |
| | | | | M2 | $H2_{M2D2}$ |
| | | | | : | : |
| | | | | MP | $H2_{MPD2}$ |
| | | $H1'_{AD2}$ | T2 | M1 | $H2'_{M1D2}$ |
| | | | | M2 | $H2'_{M2D2}$ |
| | | | | : | : |
| | | | | MP | $H2'_{MPD2}$ |
| : | : | : | | : | : |
| AD X (1128) | 00:1C:D5:B4:7D:1E | $H1_{ADX}$ | T1 | M1 | $H2_{M1DX}$ |
| | | | | M2 | $H2_{M2DX}$ |
| | | | | : | : |
| | | | | MY | $H2_{MYDX}$ |
| | | $H1'_{ADX}$ | T2 | M1 | $H2'_{M1DX}$ |
| | | | | M2 | $H2'_{M2DX}$ |
| | | | | : | : |
| | | | | MY | $H2'_{MYDX}$ |

FIGURE 11

METHODS AND APPARATUS FOR USING VISIBLE LIGHT COMMUNICATIONS FOR CONTROLLING ACCESS TO AN AREA

FIELD

The present application relates to wireless communications and, more particularly, to methods and apparatus for using visible light communications signals and/or radio signals for controlling access to one or more geographic areas, e.g., buildings, rooms etc.

BACKGROUND

Visible light communication (VLC) using light emitting diodes (LEDs) offers the potential for high data rate wireless communication. By some estimates, LEDs will dominate the lighting market of the future and as such will create the opportunity for enabling auxiliary downlink carriers for indoor wireless access.

In various known systems access to a building or rooms inside a building is based on authentication of a user, e.g., an employee, customer, or any individual who is authorized to access an area. Currently, most of the systems implement user authentication using RFID (Radio Frequency Identification) technology which requires that users carry RFID badges which are read by RFID reader devices at points of entry to certain areas of a building. The obvious drawback of this approach is the need to install reader terminals as well as requiring the users to carry dedicated RFID badges. Other drawbacks are RFID badge commissioning for new users/visitors and badge updates. Even more importantly, RFID has been shown to have security problems. It has been recently shown that the information embedded in passive NFC (Near Field Communication) and RFID tags can be covertly read by an Android phone emulating the behavior of an authentic reader device.

Thus it should be appreciated that RFID and NFC tag based authentication methods though easily available are not as secure as desired by many organizations which prefer highly secure building access. Based on the above discussion it should be appreciated that there is a need for new methods and apparatus that can be used to provide secure access to an area without requiring dedicated badge/tag reader devices to be installed. It would be desirable if such methods and apparatus could use of mobile communications devices such as smart phones that a typical user may carry thereby eliminating the need for a separate RFID (Radio Frequency Identifier) device such as a badge and/or some other additional gadget to be carried by the user.

SUMMARY

Various methods and apparatus are directed to communicating information using visible light communications which can be used by an authorized device for accessing an area by controlling an access device, e.g., a door. Various described methods and apparatus are well suited to an indoor environment but can also be used in outdoor environments as well. Some methods and apparatus are directed to a mobile wireless communications device, e.g., a user equipment (UE) device, including a VLC receiver for receiving VLC signals from a VLC transmitter device, e.g., an LED (light emitting diode) device that transmits a light signal by emitting it. The mobile wireless communications device may support a plurality of alternative technologies, communications protocols, and/or frequencies. In some embodiments the mobile wireless communications device is a cell phone which includes a camera or other light sensor capable of receiving a VLC signal and a radio transmitter, e.g., a cellular WiFi, Bluetooth and/or other type of radio transmitter.

In accordance with some features of the described methods and apparatus, low-rate visible light communication (VLC) signals transmitted by LED luminaires normally used for lighting, are utilized for communicating information that can be used by authorized mobile communications devices to control an access device, e.g., a door, to access an area.

In accordance with some embodiments, a mobile communications device equipped with a camera is used as the receiver and LED-based lighting infrastructure is used as the transmitter of a signal that is used to perform access authorization. In some embodiments mobile communications device is a smart phone, e.g., an Iphone, an android based device or another type of smart phone. In various embodiments the mobile communications device is equipped with at least one of a camera or a specialized VLC receiver.

An exemplary method of operating a mobile wireless communications device, in accordance with some embodiments, comprises: receiving, in a visible light communications signal, identification information corresponding to an access device located in a vicinity of a visible light transmitter emitting said visible light communications signal; generating a value based on said received identification information and a unique identifier (ID) corresponding to said mobile wireless communications device; and transmitting the generated value to an access authorization device in a control message used to trigger unlocking of said access device associated with the received identification information by said access authorization device.

An exemplary mobile wireless communications device, in accordance with some embodiments, includes at least one processor configured to: receive, in a visible light communications signal, identification information corresponding to an access device located in a vicinity of a visible light transmitter emitting said visible light communications signal; generate a value based on said received identification information and a unique ID corresponding to said mobile wireless communications device; and transmit the generated value to an access authorization device in a control message used to trigger unlocking of said access device associated with the received identification information by said access authorization device. The exemplary mobile wireless communications device further includes memory coupled to the at least one processor.

An exemplary method of operating an access authorization device (e.g., server), in accordance with some embodiments, comprises: storing a plurality of unique identifiers (IDs) corresponding to mobile wireless communications devices authorized to control an access device used to control access to an area; receiving a hashed value from a mobile wireless communications device, said hashed value having been generated from identification information corresponding to said access device and a unique ID corresponding to said mobile wireless communications device seeking to trigger unlocking of said access device; determining if the received hashed value was generated from one of said plurality of stored unique IDs corresponding to mobile wireless communications devices authorized to control said access device and identification information corresponding to said access device; and unlocking said access device when it is determined that the received hashed value was generated from one of said plurality of stored unique identifiers corresponding to mobile wireless communications devices authorized to control said access device and identification information corresponding to said access device.

An exemplary access authorization device, in accordance with some embodiments, includes at least one processor configured to: store a plurality of unique identifiers (IDs) corresponding to mobile wireless communications devices authorized to control an access device used to control access to an area; receive a hashed value from a mobile wireless communications device, said hashed value having been generated from identification information corresponding to said access device and a unique ID corresponding to said mobile wireless communications device seeking to trigger unlocking of said access device; determine if the received hashed value was generated from one of said plurality of stored unique IDs corresponding to mobile wireless communications devices authorized to control said access device and identification information corresponding to said access device; and unlock said access device when it is determined that the received hashed value was generated from one of said plurality of stored unique identifiers corresponding to mobile wireless communications devices authorized to control said access device and identification information corresponding to said access device. The exemplary access authorization device further includes memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 3 illustrates a table including information regarding access devices and lighting devices in the system of FIG. 1, in accordance with an exemplary embodiment.

FIG. 8A is a first part of a flowchart of an exemplary method of operating an access authorization device in accordance with an exemplary embodiment.

FIG. 11 illustrates an access authorization information table which can, and in some embodiments is, stored in the exemplary access authorization device of FIG. 9.

DETAILED DESCRIPTION

Figure 1:
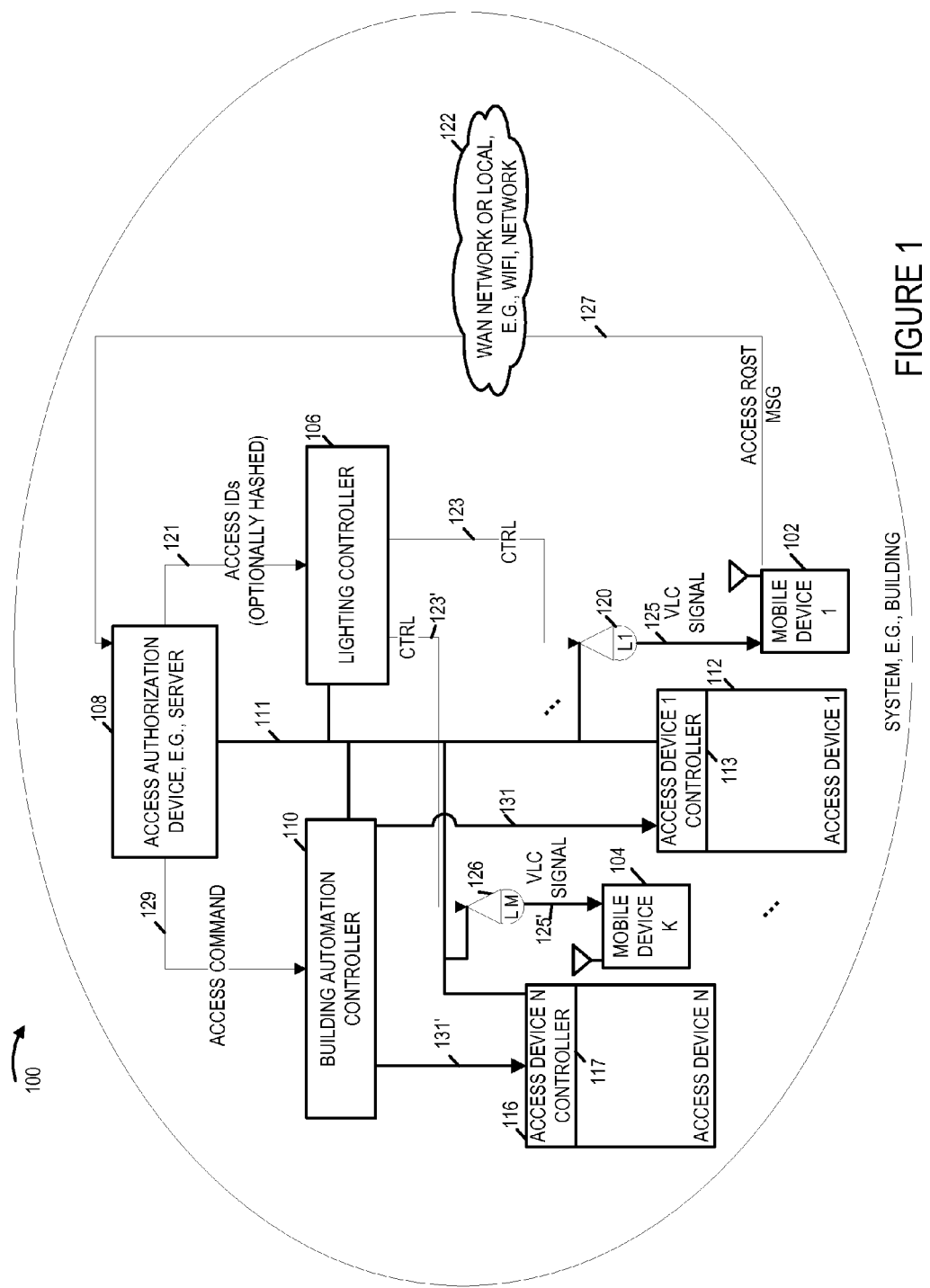
FIG. 1 is a drawing of an exemplary communications system in accordance with various exemplary embodiments.

FIG. 1 is a drawing of an exemplary communications system 100 in accordance with various exemplary embodiments. Exemplary communications system includes a plurality of connected control elements, e.g., an access authorization device 108, a building controller 110, a lighting controller 106, and various access devices 116, 112 which are able to communicate with each other via, e.g., a network 111. The network 111 maybe, and in some embodiments is a power line communication (PLC) network. However, it should be appreciated that rather than using power line communications the network 111 may be a wireless network. The lighting controller 106 is coupled to lighting fixtures sometimes referred to as luminaires 120, 126, e.g., via power line communications lines and/or other network connections which maybe and in some embodiments are, part of the communications network 111. Via the network 111, the various elements of the system 100 can interact with each other, e.g., in a secure manner.

The luminaires 120, 126 maybe, and in some embodiments are, LED devices capable of modulating information on transmitted visible light communications signals. In some embodiments the information communicated to the luminaire 120, 126 is modulated directly on the visible light communications signal generated by simply supplying the power line signal, which is modulated with the information, to the LED or other light emitting element resulting in the generated light communications signal including the information that was modulated on the power line supplying the luminaire with power. In other embodiments, information received by the luminaire is decoded and then modulated on the visible light communications signal being generated by the luminaire. Regardless of the approach used, the luminaire 120, 126 can be, and is, used to transmit an access identifier which corresponds to the transmitting luminaire and the access device 112, 116 to which the luminaire 120 or 126 corresponds.

While the power line communications network 111 may, and in some embodiments is, used for communicating between the various controller's and control devices in the system 100, the system also includes a wireless network 122 via which mobile devices, e.g., mobile device 102, 104 can send signals to the access authorization device 108 in an attempt to gain access to a secure area via one of the access devices 116 or 112. The access devices 112, 116 maybe, e.g., electronically controllable access doors including electronically controllable locks which can be controlled via the access device controller 113 or 117 included in the access device. Each access device 116, 112 includes an access device controller 117, 113 that can receive and respond to commands, e.g., by unlocking or locking the access device 116 or 112 in which the access device controller is located.

Access authorization device 108, which maybe and sometimes is implemented as a server, provides Access ID information, e.g., via signal 121 which may be communicated via network 111, to the lighting controller 106. The access ID information may be timing varying, e.g., time dependent hashed access IDs corresponding to the individual access devices 112, 117.

The lighting controller 106 communicates control signals 123, 123' to luminaires 120, 126, respectively. These signals respectively communicate access ID information, e.g. a hashed access ID value corresponding to the particular access device 112, 116 and luminaire 120, 126. The luminaire receiving the access ID information will transmit the information as part of a VLC signal output by the luminaire.

Each luminaire is positioned in the proximity of a corresponding access device 112 or 116. For example, luminaire 120 is positioned above and/or in front of access device 112 so that a mobile device, e.g., mobile device 1 102, in proximity of the access device 112 will be able to receive the identifier information corresponding to the access device 112 and representative luminaire L1 120 via the VLC signal 125 transmitted by luminaire 120. Similarly, mobile device K 104 will be able to receive the access identifier information corresponding to the access device 116 and representative luminaire L M 126 transmitted by luminaire 126 in VLC signal 125'. The access identifier information, e.g., hashed access ID corresponding to luminaire 126 and access device 116 can be received the mobile device 104 since the mobile device 104 is in close proximity, e.g., under luminaire 126, to the access device, e.g., door 116.

In some embodiments a mobile wireless communications devices is a user equipment (UE) device, e.g., mobile wireless terminal which is capable of sending signals. In some, but not necessarily all, embodiments, one or more of mobile wireless communications devices are implemented as portable communications devices such as handheld cell phones or portable personal data assistant (PDA) devices.

Each mobile wireless communications device includes a light receiver, e.g., camera or VLC sensor, and at least one wireless radio transmitter. In some embodiments mobile wireless communications devices are implemented as smart phones equipped with a camera where the camera is capable of performing the functions of a light receiver and the LED-based lighting infrastructure, e.g., the lighting device L1 120 through lighting device L M 126, are used as the light transmitters for transmitting visible light communications signals (VLC signals) carrying information used to perform access authorization.

During operation, the mobile device 102 will receive the VLC signal including an access identifier information corresponding to the access device 112 and the luminaire, e.g., the luminaire 120 that transmitted VLC signal 125. The mobile device 102 can then generate from the received information included in the VLC signal an access request message 127 which it can sent via the wireless network 122 to the access authorization device 108. From the information included in the received message, the access authorization device 108 can determine what access ID information the mobile device 102 received via a VLC signal, and thus what luminaire 120 or 126 transmitted the access ID information. This allows the access authorization server 108 to determine which access device 112 or 116 the user of the mobile device is seeking to access since the authorization server maintains, e.g. a list of access IDs and/or access ID information transmitted by the individual luminaires 120, 126. The access authorization device 108 also maintains, e.g., in memory, which mobile devices are authorized to access, e.g., control the opening of, individual access devices amount the plurality of access devices known to the access authorization device 108.

Based on the information in a received access request message 127, the access authorization sever 108 decides whether or not to grant access to a user of the mobile device 102, or 104 from which an access request message was received.

If the access authorization device 108 determines that the user of the mobile device 102 from which the access request message 127 was received is authorized to access the access device 112 to which identifier information in the access request message corresponds, the access authorization server 108 will send a access command 129 to the building automation controller 110. The access command 129 identifies the access device, e.g., door 112, to be unlocked. In response to the access command 129, the building automation controller 110 sends a signal, e.g., an electrical or wireless signal, to the access device controller 113 of the access device 1 112, to be unlocked. For example, in the FIG. 1 embodiment signal 131 is sent to access device controller 113 to cause the access device 1 112 to unlock. In response to the unlock signal 131 the access device controller 113 will unlock the access device 112, e.g., door, allowing the user of the mobile device 102 to enter the secure area to which access is restricted by door 112.

In the event mobile device K 104 is to be given access to access device N 116, an access request generated from information included in the VLC signal 125' would be sent from the mobile device 104 to the access authorization device 108 via wireless network 122. Assuming mobile device 104 is authorized to access the secure area behind access device N 116, an access command would be sent to the building automation controller 110 causing the controller 110 to send unlock signal 131' to access device N controller 117 which would then unlock door 116 and allow the user of mobile device K 104 access to the secure area associated with door 116.

While various formats and/or method of communicating information in the access request message 127 maybe used depending on the particular embodiment, given that the communicated information includes information based on a received time varying VLC signal and also includes or is based on a mobile device identifier corresponding to the mobile device 102 or 104 sending the access request, the access authorization device 108 can determine with reasonable certainty that the access request came from a particular mobile device at a particular time thereby reducing the risk of potential replay attacks where a recorded transmission is resent in an attempt to gain access through a door.

Various message details will be explained with regard to the one or more figures which are discussed below.

Figure 2:
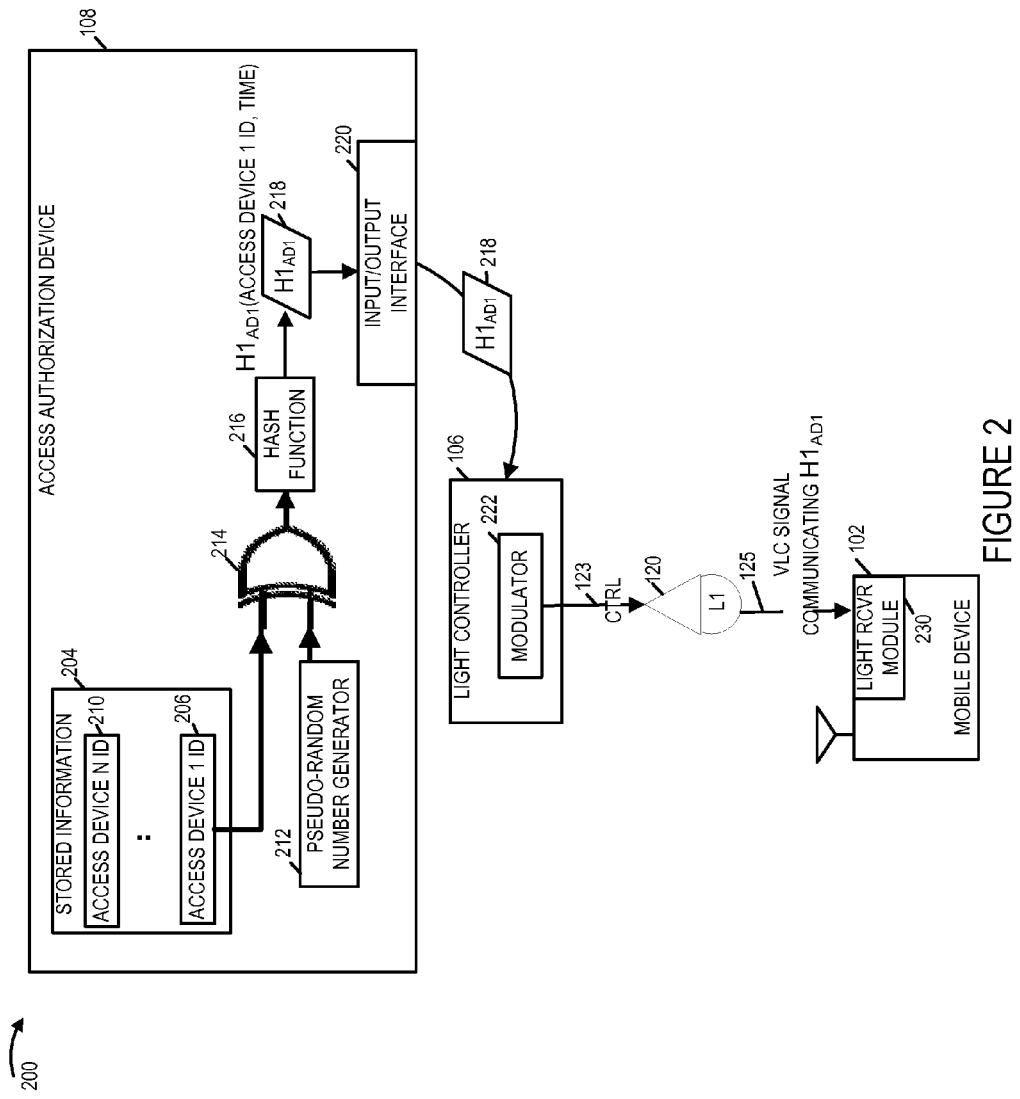
FIG. 2 illustrates a portion of the system of FIG. 1 and the signaling between various devices in greater detail, in accordance with an exemplary embodiment.

FIG. 2 is a drawing 200 illustrating a portion of the system of FIG. 1 and the signaling between various devices in greater detail, in accordance with an exemplary embodiment. More particularly in FIG. 2 example, communication of a hashed access ID value (H1 value) from the access authorization device 108 to the lighting controller 106 and communication of a VLC signal communicating the hashed access ID value (referred to as H1 value) to the mobile device 102 is illustrated.

The access authorization device 108 includes stored information 204 including identifiers (access IDs) corresponding to the access devices in the system 100 as shown. The stored identifiers include access device 1 ID 206 through access device N ID 210. In some embodiments the access IDs corresponding to the access devices are globally unique, e.g., such as a MAC address, or unique only within the scope of a building where the access device is located. In addition, the access authorization device 108 includes a pseudo-random number generator 212, an XOR logic gate 214, a hash function 216.

In the illustrated example, the authorization device is shown to generate a time varying hashed value corresponding to access device 1 ID 206. The access device 1 ID 206 and a pseudo-random number (PN) generated by the pseudo-random number generator 212 is input to the XOR gate 214. The output of the XOR gate (e.g., access device 1 ID XOR PN1) is supplied as input to the hash function 216. The output of the hash function 216 is the hashed access device ID value $H1_{AD1}$ 218 (H1 value corresponding to access device AD1). It should be appreciated that if the VLC transmissions were constant over time, there could be a potential for spoofing: i.e., devices which have decoded the ID once can store it and use it to control the access device from any location and any time (as long as they have access to the authorization server). Thus in some embodiments, the hash function is randomized over time, e.g., by XORing the door ID with a pseudo-random number and using that as the input to the hash function as illustrated in FIG. 2. In this way, even if a device records the hashed ID, it will not be able to use it at another time to open/control the access device without receiving the latest hash information from the VLC signal transmitted by the representative lighting device near the access device. A new hash may be generated on the time scale of human motion, for instance every ten seconds.

The hashed value $H1_{AD1}$ 218 is communicated from the access authorization device, e.g., via the input/output interface 220, to the lighting controller 106 which includes a modulator 222 in some embodiments. The lighting controller 106 controls the lighting device L1 120 by modulating a VLC signal, generated and transmitted by the lighting device L1 120, based on the bits of the received hashed access ID $H1_{AD1}$ 218. In some embodiments each luminaire (lighting device) can be individually controlled to transmit independent messages. In some embodiments this can be accomplished by a dedicated DC-powered lighting infrastructure system where the lighting devices simply use the electrical signal to drive an LED or other light transmitter creating a VLC signal (carrying the hashed access ID bits) sent along a cable from the lighting controller 106 to the light transmitter. In such embodiments it is the task of the lighting controller 106 to determine which data is to be sent to which lighting device by selecting to transmit on the appropriate cable.

In another embodiment, the lighting device, e.g., luminaire receives data, e.g., hashed access ID bits $H1_{AD1}$, from a PLC line coupled to multiple addressable luminaires in which case a digital PLC signal decoder is used in the at the lighting device to recover the information directed to the specific lighting device. In some such embodiments the transmitter is a PLC router, e.g., a Hy-Fi router, and each lighting device has a unique MAC address because the PLC line is shared across all lighting devices in the system. In some such embodiments the PLC router sends a message to a particular lighting device by appending the particular lighting device's MAC address to the preamble of a packet, e.g., packet that communicates hashed ID bits to be transmitted by the luminaire to which the MAC address corresponds. Only the lighting device with the matching MAC address decodes the received packet, recovers the hashed access ID bits (e.g., $H1_{AD1}$ bits) and re-modulates it into a VLC signal which is then transmitted, e.g., in the area of the access device to which the hashed access device identifier corresponds.

The mobile device 102 receives the VLC signal communicating the $H1_{AD1}$ bits via a light receiver module 230 includes in the mobile device 102, and processes the received information. In some embodiments the mobile device 102 uses the received hashed access ID $H1_{AD1}$ to generate an access request message in order to unlock/access the access device, e.g., access device 112, to which the received access ID ($H1_{AD1}$) corresponds.

FIG. 3 illustrates a table 300 including information regarding access devices and lighting devices in the system of FIG. 1, in accordance with an exemplary embodiment. Table 300 may, and in some embodiments is, stored in the access authorization device 108 and the light controller 106.

Each entry in column 302 represents an identifier, e.g., MAC ID or another identifier, corresponding to an access device. Each entry in column 304 indicates an access device number, e.g., door number or name, of an access device to which the identifier in the corresponding entry in column 302 corresponds. Each entry in column 306 indicates a representative lighting device identifier corresponding to the access device identified by the corresponding entries in column 302 and 304.

For example in table 300, consider first row of columns 302, 304 and 306. The first entry in column 302 identifies the identifier "00:19:47:FF:1D:2E" corresponding to the access device identified by the access device number "AD1" in the corresponding first entry in column 304. The corresponding first entry in column 306 identifies the representative lighting device "L1" which is responsible for broadcasting the access device identifier of the access device AD1 (or a hashed value of the access device identifier in some embodiments) using a VLC signal. Similarly, consider the second row of columns 302, 304 and 306. The second entry in column 302 identifies the identifier "00:1A:C3:32:B9:6A" corresponding to the access device identified by the access device number "AD5" in the corresponding entry in column 304. The corresponding second entry in column 306 identifies the representative lighting device "L15" which is responsible for broadcasting the access device identifier of access device number AD5 using a VLC signal.

Figure 4:
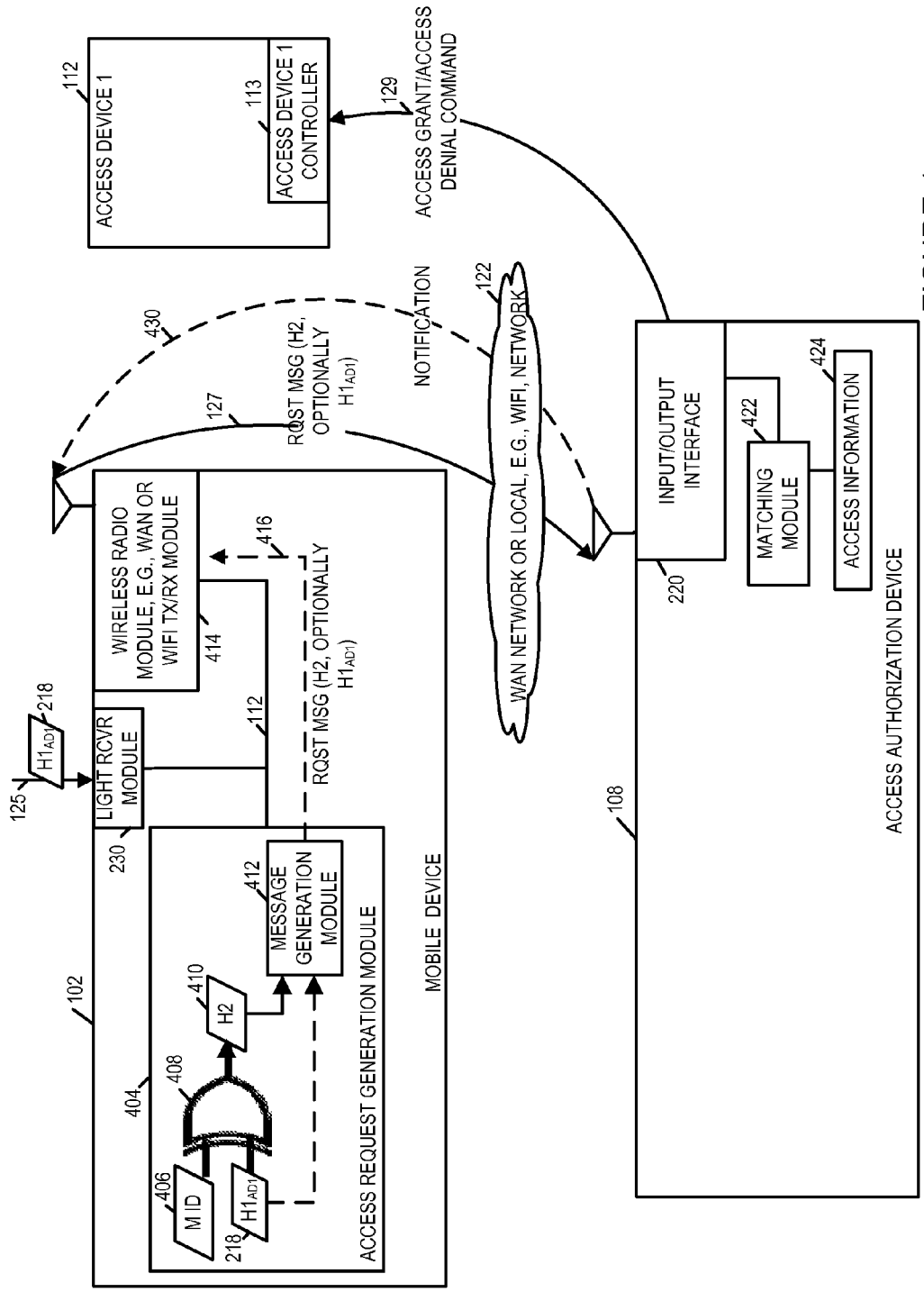
FIG. 4 illustrates a portion of the system of FIG. 1 and the signaling between a mobile wireless communications device, an access authorization device and an access device controller, in accordance with an exemplary embodiment.

FIG. 4 is a drawing 400 illustrating a portion of the system 100 in greater detail and showing the signaling between the mobile device 102, the access authorization device 108 and the access device controller 113 of access device 112, in accordance with an exemplary embodiment. More particularly signaling involved in the access request and access grant process after a mobile device, e.g., mobile device 102, receives an access device ID (or the hashed access ID value) communicated in a visible light communications signal, e.g., $H1_{AD1}$.

As illustrated in FIG. 4, the mobile device receives the visible light communications signal 125 communicating the hashed access device ID value $H1_{AD1}$, via the light receiver module 230. The mobile device 102 may store, e.g., temporarily, the received hashed value $H1_{AD1}$ and uses it to generate an access request. As shown, the mobile device 102 includes an access request generation module 404 which is configured to generate an access request message as an output. The access request generation module 404 includes an XOR gate 408 and a message generation module 412. The inputs to the XOR gate 408 are the received access ID hashed value H1 and a unique identifier corresponding to the mobile device 102, e.g., M ID 406. The output of the XOR gate is the hashed authentication value which is herein generally referred to as H2 value.

The hashed value H2 is provided as an input to the message generation module 412 which generates a request message including the hashed value H2. The message generation module 412 generates the access request message in an appropriate format suitable to be communicated, e.g., over the air, to the access authorization device 108 via a communications network, e.g., WAN such as a cellular communications network, WiFi, or another network. In some embodiments the received access ID value $H1_{AD1}$ is also provided to the message generation module 412. In some such embodiments the message generation module 412 generates an access request message including both the generated hashed value H2 and the received hashed access ID value $H1_{AD1}$ corresponding to the access device 1 112. Thus it should be appreciated that an access request message communicated to the access authorization device 108 includes the generated hashed value H2 and optionally $H1_{AD1}$ value. The generated request message is internally communicated to a wireless radio module 414 included in mobile device 102 as indicated by arrow 416. The wireless radio module 414 transmits the access request message RQST MSG 127 to the access authorization device 108.

The access authorization device 108 receives the access request message 127 via the input/output interface 220. The matching module 422 included in the access authorization device 108 performs a matching/authentication operation to determine if the mobile device UE 102 requesting access is an authorized device. In some embodiments the access authorization database 424 includes information that can be used to perform the matching/authentication operation. The stored information includes, e.g., the identifiers of mobile device that are authorized to access various access devices, access device IDs, and hashed access ID values corresponding to various access devices. Using the received access request 127 and stored information in database 424, the matching module 422 performs a matching operation to determine if the requesting device is authorized access. In some embodiments when the access request message 127 includes the H2 value generated by the mobile device but does not include H1 value corresponding to an access device (e.g., $H1_{AD1}$ value), the matching module 422 computes a list of H2 values for various possible mobile device IDs and access device IDs stored in the database 424 e.g., by computing H2=M ID XOR $H1_{AD1}$ (e.g., the bits of the mobile ID are XORed with the corresponding bits of the H1 value corresponding to access device 1 on a bit by bit basis where, in such a case, the mobile ID and H1 value have the same number of bits). Thus in such a case the task of the authorization device 108 is more complex because it has to generate H2 values for each possible hashed access ID value H1 corresponding to every access device in the system. If there is a match, the mobile device 102 is allowed access and an access grant command 129 is sent to the access device 1 controller 113 to allow access to the mobile device 102.

In some embodiments when the access request message 127 includes both the H2 value and $H1_{AD1}$ value corresponding to the access device 1 112 for which the mobile device 102 is seeking access, the matching module 422 is able to verify for which access device the access request is intended for, e.g., due to $H1_{AD1}$ value being indicated in the access request. Thus in such a case the task of the authorization device 108 is somewhat simpler as compared to the other case where $H1_{AD1}$ value was not included in the access request. To determine which mobile device wants to gain access, the matching module 422 computes a list of H2 values for various possible mobile device IDs in the database 424 that are authorized to access the device 112 and compares each entry of the list to the bits of the H2 value received from the mobile device 102. If there is a match, the mobile device 102 is allowed access and an access grant command 129 is sent to the access device controller 113 to allow access to the mobile device 102. In some embodiments optionally a notification 430 is also sent to the mobile device 102. The notification 430, e.g., an externally perceivable alert, indicates to the mobile device 102 user whether access has been granted or denied.

Figure 5:
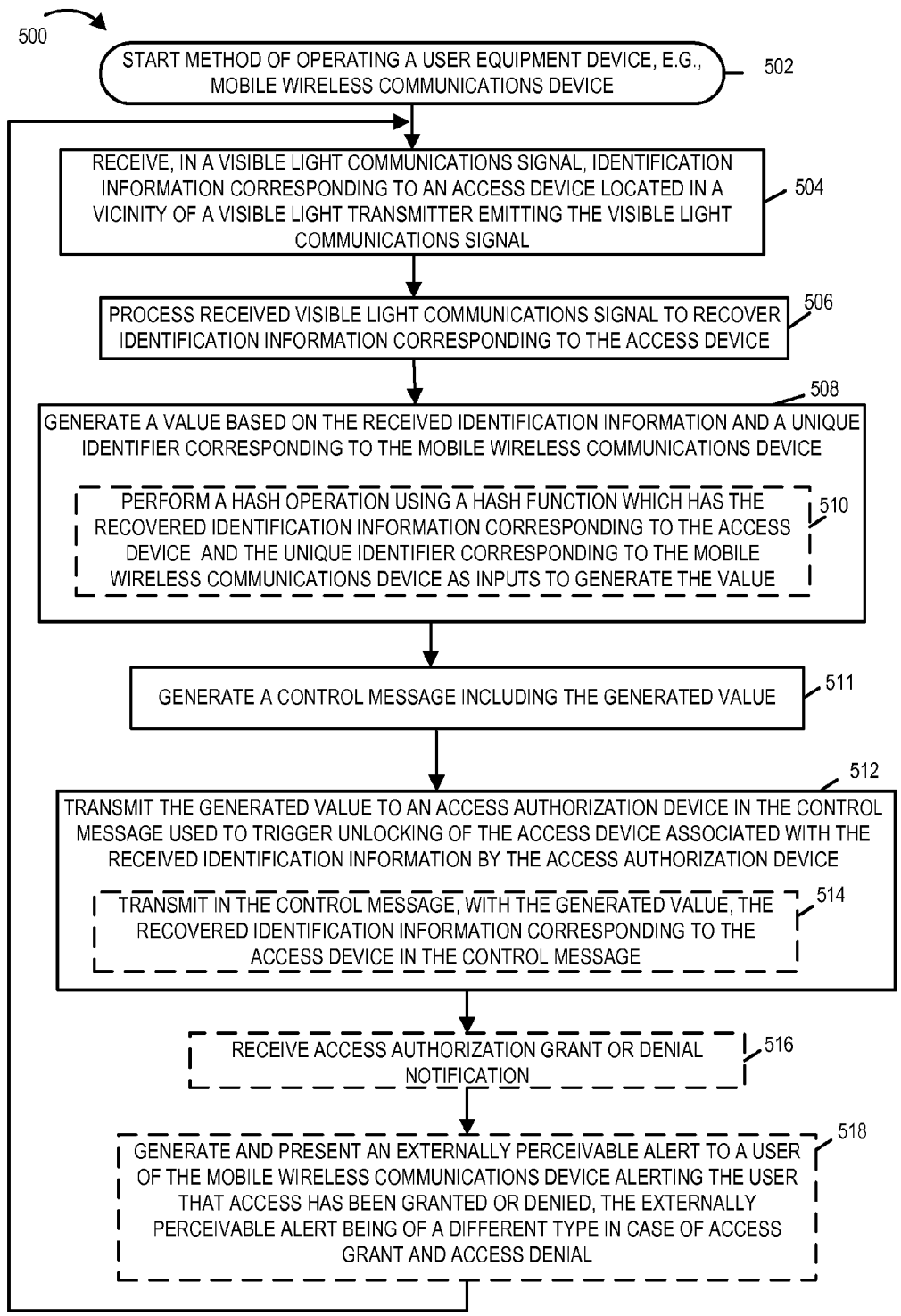
FIG. 5 is a flowchart of an exemplary method of operating a mobile wireless communications device in accordance with various exemplary embodiments.

FIG. 5 is a flowchart 500 illustrating the steps of an exemplary method of operating a mobile device, e.g., mobile wireless communications device, in accordance with an exemplary embodiment. The mobile device implementing the method of flowchart 500 is any one of the mobile device 1 102 through mobile device K 104 shown in the system of FIG. 1. For the purposes of discussion of FIG. 5 consider that mobile device 102 implements the method of flowchart 500.

Operation starts in step 502. In step 502 the mobile communications device is powered on and initialized. Operation proceeds from start step 502 to step 504. In step 504 the mobile device 102 receives, in a visible light communications signal (VLC signal), identification information corresponding to an access device located in a vicinity of a visible light transmitter emitting the visible light. In some embodiments the mobile wireless communications device is a cellular phone including a camera and the identification information in the visible light communications signal is received via the camera. In some embodiments the received identification information is the access device ID corresponding to the access device 112. In some embodiments the identification information is a hashed access device ID value, e.g., such as $H1_{AD1}$ value, corresponding to the access device, e.g., access device 112, communicated by the lighting device, e.g., such as L1 120 in the vicinity of access device 112. Thus in some embodiments the identification information corresponding to the access device is a time varying value generated using a hash function which receives as inputs a time varying value, e.g., a pseudo random number generated as a function of time, and a unique identifier corresponding to the access device.

Operation proceeds from step 504 to step 506. In step 506 following the receipt of the visible light communications signal, the mobile device 102 processes the received visible light communications signal to recover the identification information corresponding to the access device. In some embodiments processing the visible light communications signal includes recovering the communicated hashed access ID bits, e.g., bits of the $H1_{AD1}$ value.

Operation proceeds from step 506 to step 508. In step 508 the mobile device 102 generates a value (e.g., H2 value), based on the received identification information corresponding to the access device and a unique identifier corresponding to the mobile wireless communications device. In some embodiments the step 508 of generating a value includes performing step 510 in which the value is generated using a hash function which has the identification information corresponding to the access device and the identifier corresponding to the mobile device as inputs. In some embodiments in step 510 the hashed value is generated by XORing the mobile communications device identifier (M ID) with the access device identifier (e.g., $H1_{AD1}$ value). For example as discussed in FIG. 4, mobile device 102 may generate an H2 value=MID XOR $H1_{AD1}$.

Operation proceeds from step 508 to step 511. In step 511 the mobile device 102 generates a control message e.g., access request message 127, including the generated value, e.g., hashed value H2 generated in step 508, the control message being used to trigger unlocking of the access device associated with the received identification information, by the access authorization device. In some embodiments the generated control message includes with the generated value, identification information corresponding to the access device recovered from the received VLC signal.

Operation proceeds from step 511 to step 512. In step 512 the mobile device 102 transmits the generated value (e.g., H2 value), to an access authorization device in the control message used to trigger unlocking of the access device associated with the received identification information, by the access authorization device. Thus the mobile device 102 transmits the generated value in the control message, e.g., access request message 127, to the access authorization device 108. In some embodiments step 512 includes step 514 wherein the mobile device 102 transmits in the control message, with the generated value, identification information corresponding to the access device recovered from the received VLC signal. Thus in some embodiments, in addition to the H2 value the mobile device also transmits the access device ID or the hashed access device ID value, e.g., the $H1_{AD1}$ value, to the access authorization device 108. In some embodiments the control message including the generated value (H2 value) is transmitted in a radio frequency signal. In some such embodiments the radio frequency signal is transmitted over one of a WiFi communications link, a blue tooth link or a cellular communications link.

In some embodiments the access authorization device 108 is part of an access device. In such embodiments the access device includes a wireless interface and can check whether a received access request should result in unlocking of the access device, e.g., opening of the door, e.g., in the same manner that such a determination is made when the access authorization device is implemented separately from the access devices.

Operation proceeds from step 512 including step 514 to step 516. Step 516 is optional as indicated by the dashed box and is performed in some but not necessarily all embodiments. In some embodiments where step 516 is not performed, operation proceeds from step 512 back to step 504. In step 516 the mobile communications device 102 receives access authorization grant or access denial notification from the access authorization device 108. Operation proceeds from step 516 to step 518. In step 518 the mobile communications device 102 generates and presents an alert, e.g., an externally perceivable alert, to a user of the mobile communications device 102 alerting/indicating to the user that access has been granted or denied. The externally perceivable alert may be, e.g., a vibration alert, a visual alert such as flashing red or green light, and/or an audio tune of a given type. In various embodiments an externally perceivable alert presented in case of an access grant is different from an externally perceivable alert presented when access is denied. Operation proceeds from step 518 back to step 504.

Figure 6:
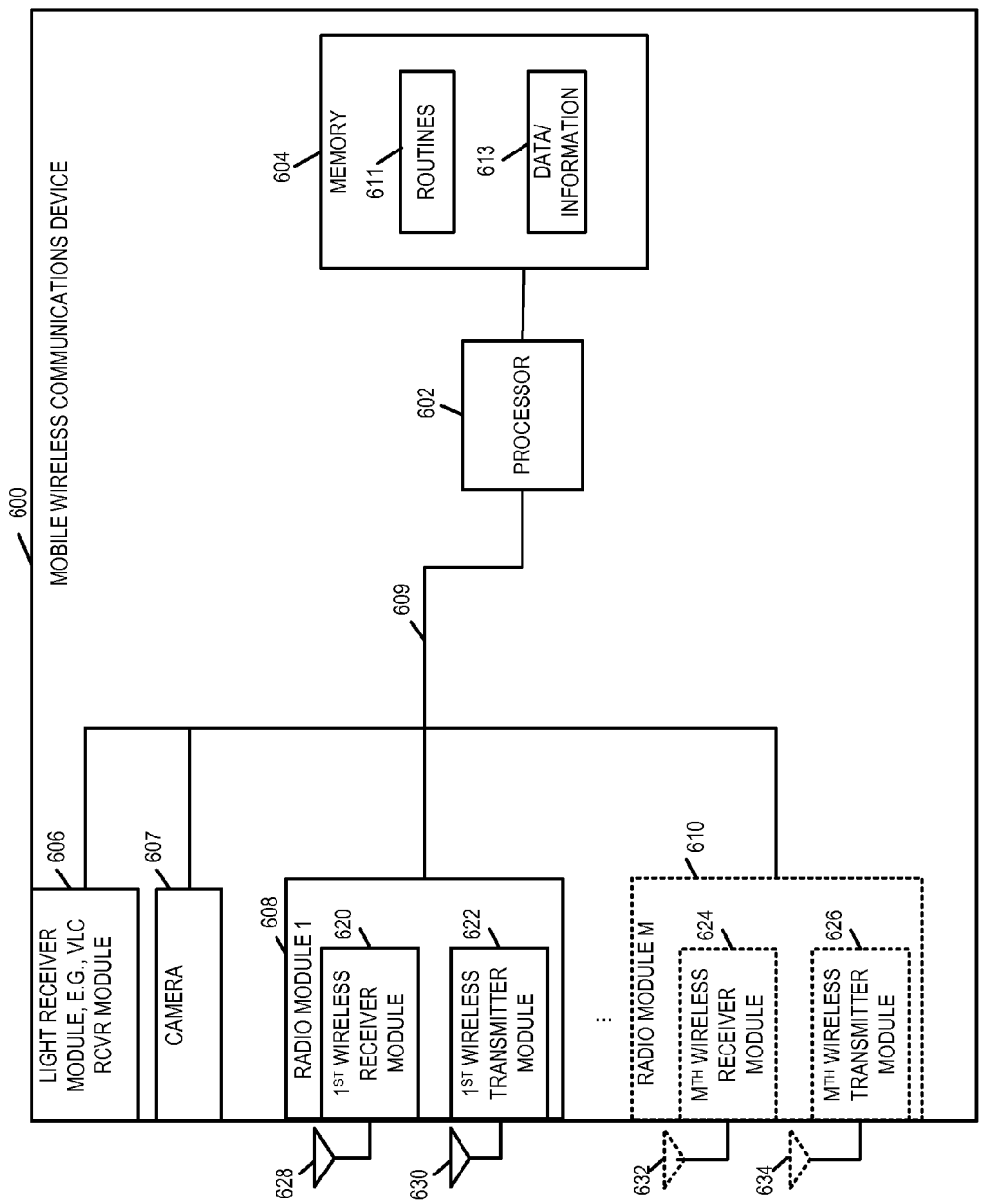
FIG. 6 is a drawing of an exemplary mobile wireless communications device in accordance with an exemplary embodiment.

FIG. 6 is a drawing of an exemplary mobile wireless communications device 600 in accordance with an exemplary embodiment. The mobile communications device 600 may, and sometimes does, implement a method in accordance with flowchart 500 of FIG. 5. The mobile wireless communications device 600 can be used as any one of the mobile devices 102 through 104 shown in FIG. 1.

The mobile device 600 includes a processor 602 and memory 604 coupled together via a bus 609 over which the various elements (602, 604) may interchange data and information. Memory 604 includes routines 611 and data/information 613. The mobile device 600 further includes a light receiver module 606, e.g., a VLC receiver module, and one or more radio modules (radio module 1 608, . . . , radio module M 610). The light receiver module 606 and radio modules (608, . . . , 610) are coupled to processor 602 via bus 609. In various embodiments, one or more or all of light receiver module 606, and radio modules (608, . . . , 610) include configurable features and are configurable, e.g., under the control of processor 602. Different configurable features include, e.g., configurable band selection, configurable bandwidth, configurable modulation scheme, configurable modulation constellation, configurable data rate, configurable coding type, configurable coding rate, configurable communications protocol, configurable power level, configurable filters, configurable symbol timing, configurable tone width, configurable timing structure, configurable channels, etc. Light receiver module 606 is configured to receive visible light communications signals (VLC signals) and process them to recover information and/or data communicated in a received VLC signal. Thus in some embodiments the light receiver module 606 receives a VLC signal communicating access device ID, e.g., H1 value, corresponding to an access device. In some embodiments the mobile communications device 600 is cellular phone. In some such embodiments the mobile communications device 600 includes a camera 607 and may not include the light receiver module 606. In some embodiments receiving the VLC signals includes receiving a VLC signal via the camera 607 included in the mobile communications device 600. The recovered information/data, e.g., access device ID, is communicated to the processor 602 in some embodiments. Processor 602 may, and in some embodiments does, generate and transmit control signals to the light receiver module 606 and/or radio modules to control their operation.

First radio module 608 includes a first wireless receiver module 620 coupled to receive antenna 628, via which the mobile device 600 receives radio signals. The radio signals include, e.g., signals communicated by the access authorization device 108, downlink traffic data signals from an access point, etc. First radio module 608 includes a first wireless transmitter module 622 coupled to transmit antenna 630, via which the mobile device 600 transmits radio signals. The radio signals include traffic data signals, e.g., uplink traffic data signals, access request message, etc. In some embodiments the first radio module 608 is a WAN (wide area network) radio module. In such embodiments the first wireless receiver module 620 is a WAN receiver while the wireless transmitter module 622 is a WAN transmitter.

The radio module M 610 includes $M^{th}$ wireless receiver module 624 coupled to receive antenna 632 via which the mobile device 600 receives radio signals and an $M^{th}$ wireless transmitter module 626 coupled to transmit antenna 634 via which the mobile device 600 transmits radio signals. In some embodiments the $M^{th}$ radio module 610 is a WiFi radio module configured to receive and transmit signals e.g., via a WiFi access point. In such embodiments the $M^{th}$ wireless receiver module 624 is a WiFi receiver while the wireless transmitter module 626 is a WiFi transmitter. Various other types of radio modules besides WAN, WiFi radio modules may be used in some embodiments, e.g., such as a Bluetooth module.

Thus in some embodiments, the different radio modules correspond to different communications technologies, different communications protocols and/or different frequency bands. For example, one radio module may correspond to WiFi, another radio module may correspond to LTE, and still another radio module may correspond to CDMA. In some embodiments, the mobile device 600 may, and sometimes does, simultaneously communicate with one base station, e.g., a WiFi AP, via radio module 610 and with another base station, e.g., an LTE base station, via radio module 608. One or more of the radio modules may be activated and/or used.

In some embodiments, one or more of modules 606, 608, and 610 are included in processor 602. In some embodiments, one or more of portions of one or more of modules 606, 608, and 610 are included in processor 602.

In various embodiments, processor 602 is configured to receive, in a visible light communications signal (VLC signal), identification information corresponding to an access device located in a vicinity of a visible light transmitter emitting the visible light. In some embodiments the identification information is the access device ID corresponding to the access device 112. In some embodiments the identification information is the hashed access device ID value, e.g., such as $H1_{AD1}$ value, corresponding to the access device, e.g., access device 112, communicated by the lighting device, e.g., such as L1 120 in the vicinity of access device 112.

In some embodiments the processor 602 is further configured to process the received visible light communications signal light to recover the identification information corresponding to the access device. In some embodiments processing the visible light communications signal includes recovering the communicated hashed access ID bits, e.g., bits of the $H1_{AD1}$ value.

In some embodiments the processor 602 is further configured to generate a value (e.g., H2 value), based on the identification information corresponding to the access device and a unique identifier corresponding to the mobile wireless communications device 600. In some embodiments the processor 602 is configured, as part of being configured to generate a value, to generate the value using a hash function which has the identification information corresponding to the access device and the identifier corresponding to the mobile device 600 as inputs. In some embodiments the processor 602 is configured to generate the value by XORing the mobile wireless communications device identifier (M ID) with the access device identifier (e.g., $H1_{AD1}$ value).

In some embodiments the processor 602 is further configured to generate a control message e.g., such as access request message 127, including the generated value, e.g., hashed value H2, the control message being used to trigger unlocking of the access device associated with the received identification information, by an access authorization device. In some embodiments the processor is configured to include the identification information corresponding to the access device recovered from the received VLC signal in the generated control message with the generated value.

In various embodiments the processor 602 is further configured to transmit the generated value (e.g., H2 value), to an access authorization device in a control message used to trigger unlocking of the access device associated with the received identification information, by the access authorization device. Thus in some embodiments the processor 602 is configured to transmit, e.g., via wireless transmitter 622/626, the generated value in a control message, e.g., access request message 127, to the access authorization device 108. In some embodiments the processor 602 is further configured to transmit in the control message, with the generated value, identification information corresponding to the access device recovered from the received VLC signal. Thus in some embodiments, in addition to the H2 value the processor 602 is configured to transmit the hashed access device ID, e.g., the $H1_{AD1}$ value, to the access authorization device 108. In some embodiments the processor 602 is further configured to transmit the control message including the generated value (H2 value) in a radio frequency signal. In some such embodiments the processor 602 is further configured to transmit the radio frequency signal over one of a WiFi communications link (e.g., via a WiFi radio module), a blue tooth link (e.g., via a Bluetooth radio module) or a cellular communications link (e.g., via a WAN radio module).

Processor 602 in some embodiments is further configured to receive access authorization grant or access denial notification from the access authorization device 108. In some embodiments the processor 602 is further configured to generate and present an alert, e.g., an externally perceivable alert, to a user of the mobile communications device 600 alerting/indicating to the user that access has been granted or denied.

Figure 7:
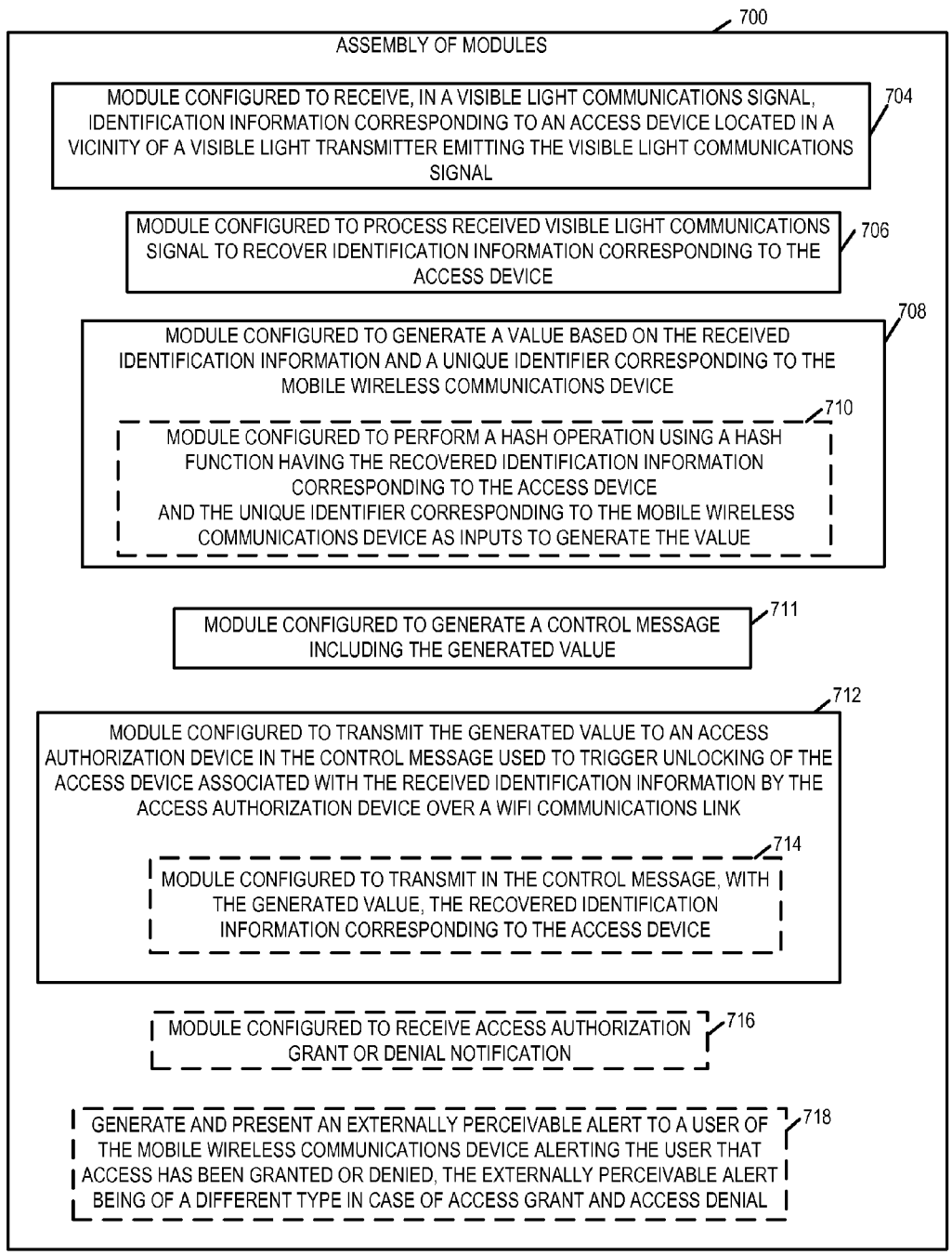
FIG. 7 illustrates an assembly of modules which can, and in some embodiments is, used in the mobile wireless communications device illustrated in FIG. 6.

FIG. 7 is an assembly of modules 700 which can, and in some embodiments is, used in the mobile communications device 600 illustrated in FIG. 6. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and or with some modules being external to the processor may be one of a design choice. Alternatively, rather than being implemented as circuits, all or some of the modules may be implemented in software and stored in the memory 604 of the mobile device 600 shown in FIG. 6 with the modules controlling operation of the mobile device 600 to implement the functions corresponding to the modules when the modules are executed by a processor, e.g., processor 602.

In still other embodiments, various modules are implemented as a combination of hardware and software, e.g., with a circuit external to the processor 602 providing input to the processor 602 which then under software control operates to perform a portion of a module's function.

While shown in the FIG. 6 embodiment as a single processor 602, e.g., computer, within device 600, it should be appreciated that processor 602 may be implemented as one or more processors, e.g., computers. When implemented in software, the modules include code, which when executed by the processor, configure the processor, e.g., computer, to implement the function corresponding to the module. In some embodiments, processor 602 is configured to implement each of the modules of the assembly of modules 700. In embodiments where the assembly of modules 700 is stored in memory 604, and the memory 604 is a computer program product, the computer program product comprises a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile device 600 or elements therein such as the processor 602 to perform the functions of the corresponding steps illustrated and/or described in the method of flowchart 500 of FIG. 5.

Assembly of modules 700 includes a module 704 configured to receive, in a visible light communications signal (VLC signal), identification information corresponding to an access device located in a vicinity of a visible light transmitter emitting the visible light, a module 706 configured to process the received visible light communications signal to recover the identification information corresponding to the access device, and a module 708 configured to generate a value (e.g., H2 value), based on the identification information corresponding to the access device and a unique identifier corresponding to the mobile wireless communications device 600. In some embodiments the module 708 includes a module 710 configured to perform a hash operation to generate the value using a hash function which has the identification information corresponding to the access device and the identifier corresponding to the mobile device 600 as inputs. In some embodiments the module 708 is configured to generate the value by XORing the mobile wireless communications device identifier (M ID) with the access device identifier (e.g., $H1_{AD1}$ value).

In some embodiments the identification information is the access device ID corresponding to the access device 112. In some embodiments the identification information is the hashed access device ID value, e.g., such as $H1_{AD1}$ value, corresponding to the access device, e.g., access device 112, communicated by the lighting device, e.g., such as L1 120 in the vicinity of access device 112. In some embodiments the module 706 configured to process the visible light communications signal recovers the communicated hashed access ID bits, e.g., bits of the $H1_{AD1}$ value communicated in the light communications signal. In some embodiments the module 704 and 706 are part of a camera included in the mobile communications device 600.

In various embodiments the assembly of modules 700 further includes a module 711 configured to generate a control message including the generated value, e.g., value generated by module 708 including module 710, the control message being used to trigger unlocking of the access device associated with the received identification information by an access authorization device. In some embodiments the module 711 is further configured to include the identification information corresponding to the access device recovered from the received VLC signal in the generated control message with the generated value.

In various embodiments the assembly of modules 700 further includes a module 714 configured to transmit the generated value (e.g., H2 value), to an access authorization device in the control message used to trigger unlocking of the access device associated with the received identification information, by the access authorization device. In some embodiments the module 714 includes a module 716 configured to transmit in the control message, with the generated value, identification information corresponding to the access device recovered from the received VLC signal. Thus in some embodiments, in addition to the generated (e.g., H2) value the hashed access device ID, e.g., the $H1_{AD1}$ value, is also included in the control message and transmitted to the access authorization device 108.

In some embodiments the generated control message is transmitted in a radio frequency signal. In some such embodiments the module 712 is configured to transmit the radio frequency signal over one of a WiFi communications link, a blue tooth link or a cellular communications link.

In some embodiments the assembly of modules 700 further includes a module 716 configured to receive an access authorization grant or access denial notification from the access authorization device 108, and a module 718 configured to generate and present an alert, e.g., an externally perceivable alert, to a user of the mobile communications device 600 on the mobile communications device 600, alerting/indicating to the user that access has been granted or denied.

Figure 8B:
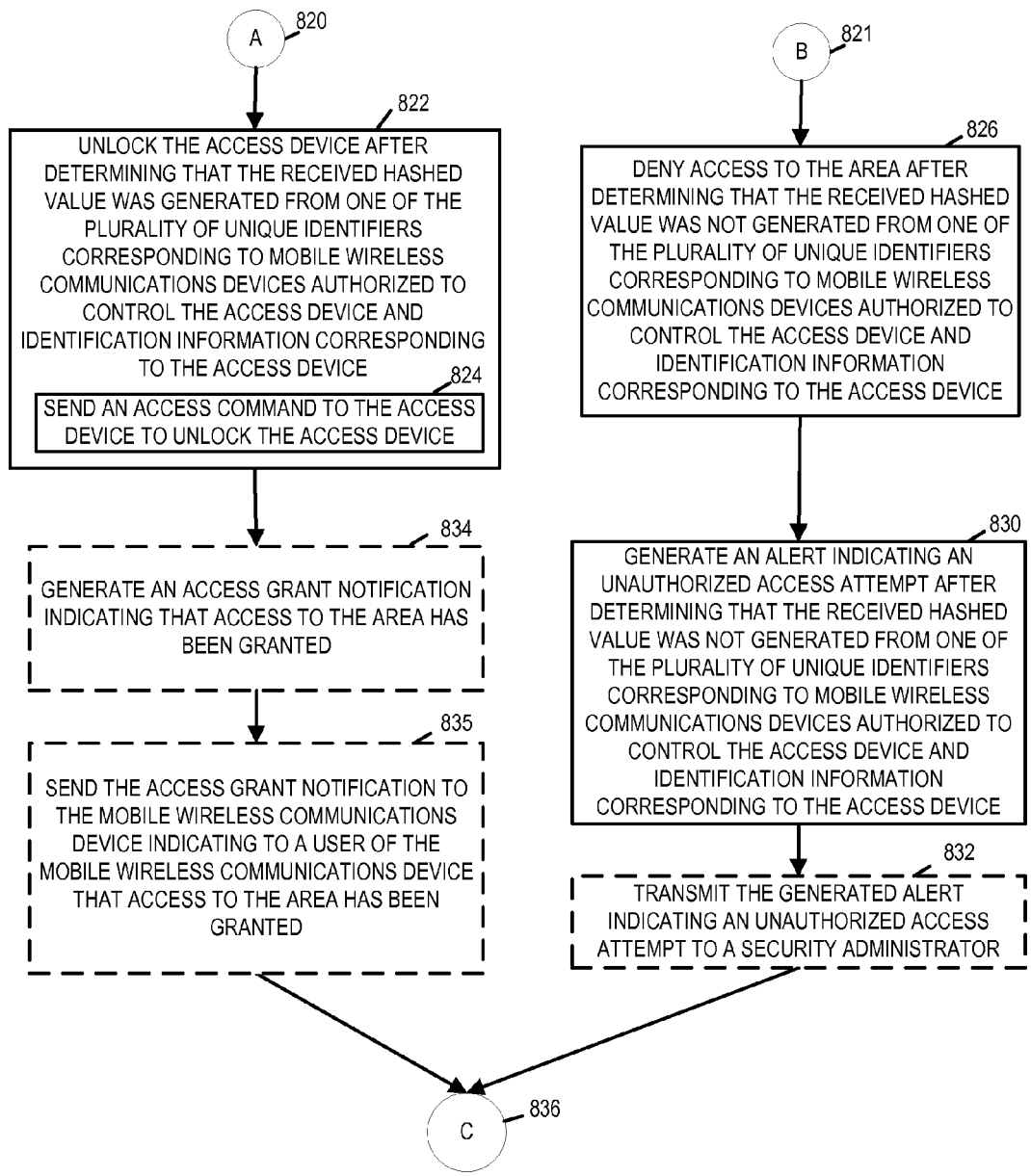
FIG. 8B is a second part of the flowchart of an exemplary method of operating an exemplary access authorization device in accordance with an exemplary embodiment, with FIGS. 8A and 8B in combination being referred to as FIG. 8.

FIG. 8 which comprises a combination of FIGS. 8A and 8B is a flowchart 800 illustrating the steps of an exemplary method of operating an access authorization device, in accordance with an exemplary embodiment. The access authorization device 108, e.g., server, illustrated in FIGS. 1, 3 and 4 can be used to implement the method of flowchart 800 in some embodiments.

Operation starts in step 802. In step 802 the access authorization device is powered on and initialized. Operation proceeds from start step 802 to steps 804 and 805 which can be performed independently and asynchronously. In step 804 the access authorization device stores, e.g., in an information database, identifiers corresponding to access devices, e.g., access device IDs corresponding to various access devices in the system. In some embodiments the identifiers corresponding to access devices may be pre-loaded in the access authorization device or the access authorization device may obtain the identifiers from an administrator managing the system 100 devices.

Operation proceeds from step 804 to step 806. In step 806 the access authorization device generates identification information corresponding to at least one access device, e.g., access device 1 112 (AD1), by hashing an identifier corresponding to the at least one access device with a time varying value. Thus in some embodiments the generated identification information corresponding to an access device is a hashed access ID value generated by hashing an access device identifier with a time varying value. For example, referring briefly to FIG. 2 example, identification information, e.g., hashed access ID value $H1_{AD1}$ value, is generated for access device 112 using the identifier 206 of the access device 112 and a pseudo-random number value. It should be appreciated that in some embodiments, more than one identification information, e.g., hashed access ID values, are generated for a single access device. Thus access device 1 112 may have one or more hashed access ID value(s) which are generated from the same identifier 206 of the access device 1 112 but different time varying values, e.g., different pseudo-random numbers generated by the pseudo-random number generator at different times. Each of the different ones of the hashed access ID values still correspond to the same access device, e.g., access device 112, but each hashed access ID value may be valid for a different time period.

Operation proceeds from step 806 to step 808. In step 808 the access authorization device provides, i.e., communicates, the generated identification information (e.g., hashed access ID value) corresponding to the at least one access device to a light controller, e.g., light controller 106, via a power line. In various embodiments the lighting controller then communicates the identification information corresponding to the at least one access device to a light emitting device, e.g., L1 120. In some embodiments the access authorization device communicates the generated identification information corresponding to the at least one access device to light emitting device via a power line. In some embodiments the access authorization device communicates the generated identification information corresponding to the at least one access device via one of: a power line, a wireless signal; an Ethernet link or a DALI (Digital Addressable Light Interface). In some embodiments the access authorization device does not generate hashed access ID value but rather provides the stored identifier corresponding to the access device to the light controller 106. The process illustrated in steps 804, 806 and 808 is discussed in greater detail in FIG. 2. Operation proceeds from step 808 back to step 806 where the access authorization device may, and in some embodiments does, generate identification information (e.g., hashed access ID values) corresponding to one or more other access devices.

In step 805, the access authorization device stores a plurality of unique identifiers (IDs), e.g., user or device ID, corresponding to mobile wireless communications devices authorized to control an access device, e.g., AD1 112, used to control access to an area. In some embodiments the identifiers are mobile device IDs corresponding to the mobile wireless communications devices that are authorized to control an access device.

Operation proceeds from step 805 to step 810. In step 810 the access authorization device receives a hashed value (e.g., an H2 value) from a mobile wireless communications device, e.g., in a control message such as access request 127, the hashed value having been generated from identification information corresponding to the access device (e.g., hashed access device ID value, e.g., H1 value such as $H1_{AD1}$) and a unique identifier (ID) corresponding to the mobile wireless communications device seeking to trigger unlocking of the access device. In some embodiments step 810 of receiving hashed value includes step 812 wherein the access authorization receives, in addition to the hashed value, identification information corresponding to the access device, e.g., H1 value, from the mobile communications device in the control message. Thus in some embodiments the access authorization device receives identification information, e.g., H1 value, corresponding to the access device along with the hashed value generated by the mobile device. For example, as illustrated in FIG. 4 example in some embodiments the mobile device 102 communicates identification information, e.g., hashed access ID value $H1_{AD1}$ corresponding to the access device 1 112 with the hashed value H2 generated by the mobile device 102 in the access request 127 which is received by the access authorization device 108. In some embodiments step 810 further includes step 813 wherein the access authorization receives in the control message from the mobile communications device, in addition to the hashed value, identification information corresponding to the mobile communications device, e.g., mobile device identifier. Steps 812 and 813 are optional and may not be performed in all embodiments. However it should be appreciated that the optional information which is received in some embodiments as illustrated in steps 812 and 813, reduces the processing burden on the access authorization device for authenticating the mobile communications device requesting access.

Operation proceeds from step 810 to step 814. In step 814 the access authorization device determines if the received hashed value (H2 value) was generated from one of the plurality of stored unique identifiers corresponding to the mobile wireless devices authorized to control the access device and identification information corresponding to the access device, e.g., such as value $H1_{AD1}$, value corresponding to access device 1 112. In some embodiments in order to perform the determination in step 814, steps 816, 818 and 820 are performed as part of the determining operation in step 814. In step 816 the access authorization device generates a list of hashed values using the received information from the mobile device and/or information stored in the access authorization device. In various embodiments the list of hashed values is generated using the identifiers corresponding to mobile wireless devices authorized to control the access device and identification information corresponding to the access devices, e.g., hashed access device ID values, stored in the access authorization device. If the information received from the mobile communications device in step 810 also includes the identification information (e.g., $H1_{AD1}$ value) corresponding to the access device (step 812) and/or the identifier of the mobile device requesting access (step 813), the processing load will be significantly reduced on the access authorization device since in such a case the access authorization device will only need to compute the hashed (H2) value corresponding to a particular identified mobile device seeking access to an identified access device.

In some embodiments when the access authorization device receives both the hashed value (e.g., H2) generated by the mobile wireless device and the identification information (e.g., $H1_{AD1}$ value) corresponding to the access device from the mobile device in step 810 and 812, the access authorization device in step 816 computes a list of hashed values using (i) the received identification information corresponding to the access device and (ii) stored mobile device identifiers corresponding to mobile devices that are authorized to access the access device to which the received identification information corresponds. If the received information also includes the identifier of the mobile communications device requesting access, the list of hashed values can be generated rather simply using the received mobile device identifier and the identification information corresponding to the access device. In such a case the hashed value list generated in step 816 may include just one value, i.e., hashed value (H2) generated by hashing the received identification information corresponding to the mobile device (mobile device identifier) and the identification information (H1 value) corresponding to the access device.

In some embodiments when the access authorization device receives the hashed value (e.g., H2) generated by the mobile wireless device but not the identification information corresponding to the access device nor the identifier of the mobile communications device requesting access, the access authorization device computes a list of H2 values using (i) various stored mobile device identifiers corresponding to authorized mobile devices and (ii) stored identification information corresponding to various access devices, the stored identification information corresponding to the access devices may be in the form of the identifiers (non-hashed) corresponding to the access devices or hashed access device ID values, e.g., H1 values, generated by hashing the identifiers corresponding to the access devices with a time varying value. It should be appreciated that in such a case the task of the access authorization device is more complex because it has to generate H2 values for all the access devices for which the identifiers and/or hashed access ID values (H1 values) are stored since the access authorization device does not know which access device the received control message including the hashed value (H2) is intended for.

In step 818, after the list has been generated, the access authorization device compares each entry of the list to the bits of the H2 value received from the mobile communications device in step 810 to check if the generated hash output matches the received hashed value. Operation proceeds from step 818 to step 819. In step 819 a decision is made based on the result of comparison. Thus if there is a match, the operation proceeds from step 819 to step 822 via connecting node A 820. In step 822 the access device is unlocked when it is determined that the received hashed value (H2) was generated from one of the plurality of stored unique identifiers corresponding to mobile wireless communications devices authorized to control the access device and identification information (H1 value) corresponding to the access device. As part of step 822 in order to unlock the access device the access authorization device performs step 824 where an access command, e.g., such as command 129, is sent from the access authorization device to the access device to unlock the access device. The access command may be sent over a wired or wireless link. In some embodiments the access command is sent to a building automation controller 110 which in turn unlocks the access device by controlling an individual access device controller associated with the access device to be unlocked. In some but not all embodiments, operation proceeds from step 822 including step 824 to optional step 834. In step 834 the access authorization device generates an access grant notification indicating that access to the area is granted. Operation proceeds from step 834 to step 835. In step 835 the access grant notification is sent from the access authorization device to the mobile communications device indicating to a user of the device that access to the area is granted. Operation proceeds from step 835 back to step 810 via connecting node C 836.

If it is determined that the match is unsuccessful in step 819, the operation proceeds from step 819 to step 826 via connecting node B 821. In step 826, the access authorization device denies access to the area when it is determined that the received hashed value was not generated from one of the stored plurality of unique identifiers corresponding to mobile wireless communications devices authorized to control the access device and identification information (H1) corresponding to the access device.

Operation proceeds from step 826 to step 830. In step 830 the access authorization device generates an alert indicating an unauthorized access attempt when it is determined that the received hashed value was not generated from one of the plurality of stored unique identifiers corresponding to mobile communications devices authorized to control the access device and identification information corresponding to the access device.

In some embodiments operation proceeds from step 830 to step 832 where the generated alert indicating an unauthorized access attempt is transmitted to a security administrator or another authority responsible for security of the area. Operation proceeds from step 832 back to step 810 via connecting node C 836. In some other embodiments, step 832 is not performed and the generated alert is presented, e.g., as an audio alarm and/or a message on a display device associated with the access authorization device 900 in order to notify an administrator/access authorization device operator.

Thus after authentication, an authorized mobile communications device is allowed access to the area while an unauthorized mobile communications device is denied access.

Figure 9:
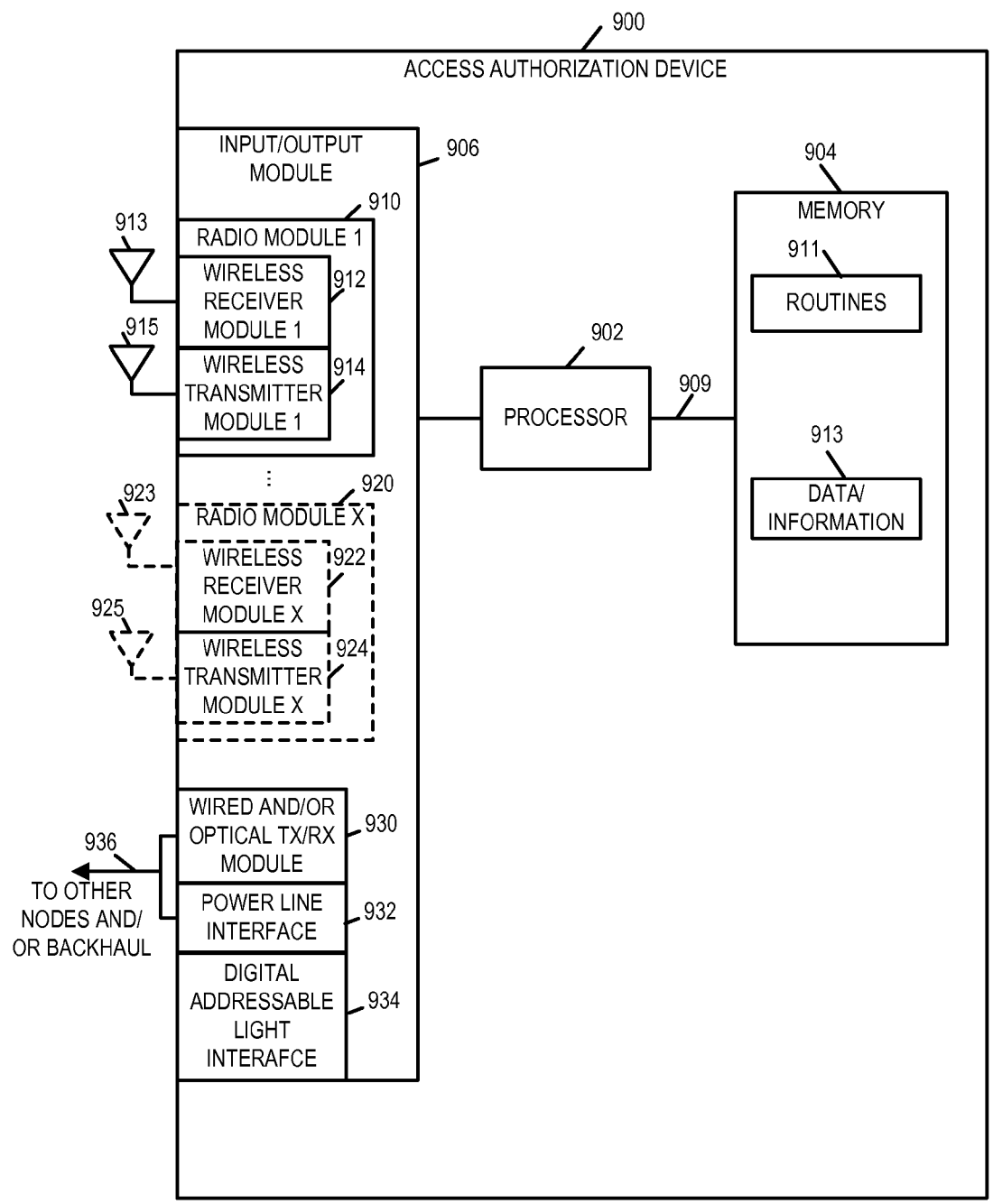
FIG. 9 is a drawing of an exemplary access authorization device in accordance with an exemplary embodiment.

FIG. 9 is a drawing of an exemplary access authorization device 900, in accordance with various embodiments. Exemplary access authorization device 900 can be used as the access authorization device 108 shown in FIGS. 1, 2 and 4. Exemplary access authorization device 900 may, and sometimes does, implement a method in accordance with flowchart 800.

The access authorization device 900 includes a processor 902 and memory 904 coupled together via a bus 909 over which the various elements (902, 904) may interchange data and information. Memory 904 includes routines 911 and data/information 913.

The access authorization device 900 further includes an input/output module 906 which may be coupled to processor 902 as shown. However, in some embodiments, the input/output module 906 is located internal to the processor 902. In some embodiments, one or more of portions of one or more of modules included in the input/output module 906 are included in processor 902. The input/output module 906 in some embodiments includes a plurality of radio modules including radio module 1 910, . . . , radio module X 920. In addition to the radio module(s) in some embodiments the input/output module 906 further includes a wired and/or optical interface 930, a power line interface 932 and a digital addressable light interface (DALI) 934 for communicating with various devices and system elements. The wired and/or optical interface 930 is capable of transmitting/receiving information over a wired and/or optical link. In some embodiments the wired and/or optical interface 930, the power line interface 932 and the digital addressable light interface 934 are coupled to other nodes and/or a backhaul via link 936.

Radio module 1 910 includes a first wireless receiver module 1 912 coupled to receive antenna 913, via which the access authorization device 900 receives radio signals. The radio signals include, e.g., signals communicated by the mobile wireless communications devices. Radio module 1 910 further includes a first wireless transmitter module 1 914 coupled to transmit antenna 915, via which the device 900 transmits radio signals. In some embodiments, the same antenna is used for both input and output wireless communications signaling. In some embodiments the radio module 910 is a WAN (wide area network) radio module. In such embodiments the first wireless receiver module 912 is a WAN receiver while the wireless transmitter module 914 is a WAN transmitter.

Radio module X 920 includes $X^{th}$ wireless receiver module 922 coupled to receive antenna 923 via which the access authorization device 900 receives radio signals and an $X^{th}$ wireless transmitter module 924 coupled to transmit antenna 925 via which the access authorization device 900 transmits radio signals. In some embodiments the $X^{th}$ radio module 920 is a WiFi radio module configured to receive and transmit signals e.g., via a WiFi access point. In such embodiments the $X^{th}$ wireless receiver module 922 is a WiFi receiver while the wireless transmitter module 924 is a WiFi transmitter. Various other types of radio modules besides WAN, WiFi radio modules may be used in some embodiments, e.g., such as a Bluetooth module. Thus in some embodiments, the different radio modules correspond to different communications technologies, different communications protocols and/or different frequency bands.

In some embodiments the access authorization device 900 communicates the identification information (e.g., unhashed or hashed access device IDs) corresponding to one or more access devices to a lighting controller via one of the wired and/or optical interface 930, power line interface 932, wireless transmitter module 914/924, or the digital addressable light interface (DALI) 934. In some embodiments the wired and/or optical interface 930 is an Ethernet interface.

In various embodiments, processor 902 is configured to store, e.g., in the memory 904, identifiers corresponding to access devices, e.g., access device IDs corresponding to various access devices in the system, and generate identification information corresponding to at least one access device, e.g., access device 1 112 (AD1), by hashing an identifier corresponding to the at least one access device with a time varying value, for example such as the identification information, e.g., hashed access ID $H1_{AD1}$ value, generated for access device 112 using the identifier 206 of the access device 112 and a pseudo-random number value as illustrated in FIG. 2 example. In some embodiments the processor 902 is configured to generate more than one identification information, e.g., hashed access ID values, for each access device for which an identifier is stored. In some embodiments the processor is further configure to receive, in addition to the hashed value, identification information corresponding to the access device, e.g., H1 value, from the mobile communications device. Thus in some embodiments the access authorization device receives identification information, e.g., H1 value, corresponding to the access device along with the hashed value generated by the mobile device.

In various embodiments the processor 902 is further configured to provide, e.g., communicate, the generated identification information (e.g., hashed access ID value) corresponding to the at least one access device to a light controller via one of the wired and/or optical interface 930, wireless transmitter module 914/924, power line interface 932 or the digital addressable light interface (DALI) 934. In some embodiments the processor 902 is configured to provide the stored identifier corresponding to the at least one access device to the light controller 106 as the identification information corresponding to the at least one access device.

In various embodiments, processor 902 is configured to store a plurality of unique identifiers (IDs), e.g., user or mobile device ID, corresponding to mobile wireless communications devices authorized to control an access device used to control access to an area, receive a hashed value (e.g., an H2 value) from a mobile wireless communications device, the hashed value having been generated from identification information corresponding to the access device (e.g., H1 value) and a unique ID corresponding to the mobile wireless communications device seeking to trigger unlocking of the access device. The processor 902 in some embodiments is further configured to determine if the received hashed value (H2 value) was generated from one of the plurality of stored unique identifiers corresponding to the mobile wireless devices authorized to control the access device and identification information corresponding to the access device, e.g., such as $H1_{AD1}$ value corresponding to access device 1 112.

In some embodiments as part of being configured to determine if the received hashed value (H2 value) was generated from one of the plurality of stored unique identifiers corresponding to the mobile wireless devices authorized to control the access device and identification information corresponding to the access device, the processor 902 is configured to: (i) generate a list of hashed values using the identifiers corresponding to mobile wireless devices authorized to control the access device and identification information corresponding to the access devices, e.g., hashed access device ID values, stored in the access authorization device 900, (ii) compare each entry of the generated list to the bits of the hashed value received from the mobile communications device, and (iii) decide based on the comparison if the received hashed value (H2) matches a hashed value in the generated list of hashed values, i.e., determine if the match is successful. If there is a match, the processor 902 is configured to determine that the received hashed value (H2 value) was generated from one of the plurality of stored unique identifiers corresponding to the mobile wireless devices authorized to control the access device and identification information corresponding to the access device. If the match is unsuccessful the processor 902 is configured to determine that the received hashed value (H2 value) was not generated from one of the plurality of stored unique identifiers corresponding to the mobile wireless devices authorized to control the access device and identification information corresponding to the access device.

In some embodiments when the access authorization device 900 receives both the hashed value (e.g., H2) generated by the mobile wireless device and the identification information (e.g., $H1_{AD1}$ value) corresponding to the access device from the mobile device in step 810 and 812, the processor 902 is configured to compute a list of hashed values using (i) the received identification information corresponding to the access device and (ii) stored mobile device identifiers corresponding to mobile devices that are authorized to access the access device to which the received identification information corresponds. In some embodiments when the access authorization device 900 receives the hashed value (e.g., H2) generated by the mobile wireless device but not the identification information corresponding to the access device, the processor 902 is configured to compute a list of H2 values using (i) various stored mobile device identifiers corresponding to authorized mobile devices and (ii) stored identification information corresponding to various access devices.

In various embodiments the processor 902 is further configured to unlock the access device when it is determined that the received hashed value (H2) was generated from one of the plurality of stored unique identifiers corresponding to mobile wireless communications devices authorized to control the access device and identification information (H1 value) corresponding to the access device. In some embodiments the processor 902 is configured to send an access command, e.g., such as command 129, to the access device to unlock the access device as part being configured to unlock the access device. The access command may be sent over a wired or wireless link. In some In some embodiments the processor 902 is further configured to generate an access grant notification indicating that access to the area is granted and send the access grant notification from the access authorization device 900 to the mobile communications device indicating to a user of the device that access to the area is granted.

In some embodiments when it is determined that the received hashed value (H2) was not generated from one of the stored plurality of unique identifiers corresponding to mobile wireless communications devices authorized to control the access device and identification information (H1) corresponding to the access device, the processor 902 is further configured to deny the mobile communications device access to the area and generate an alert indicating an unauthorized access attempt. In some such embodiments the processor 902 is further configured to transmit the generated alert indicating an unauthorized access attempt to a security administrator or another authority responsible for security of the area, e.g., wirelessly or over a wired link. In some embodiments, the processor 902 is configured to present the generated alert, e.g., as an audio alarm and/or a message on a display device associated with the access authorization device 900 in order to notify an administrator/access authorization device operator.

Figures 10, 10A:
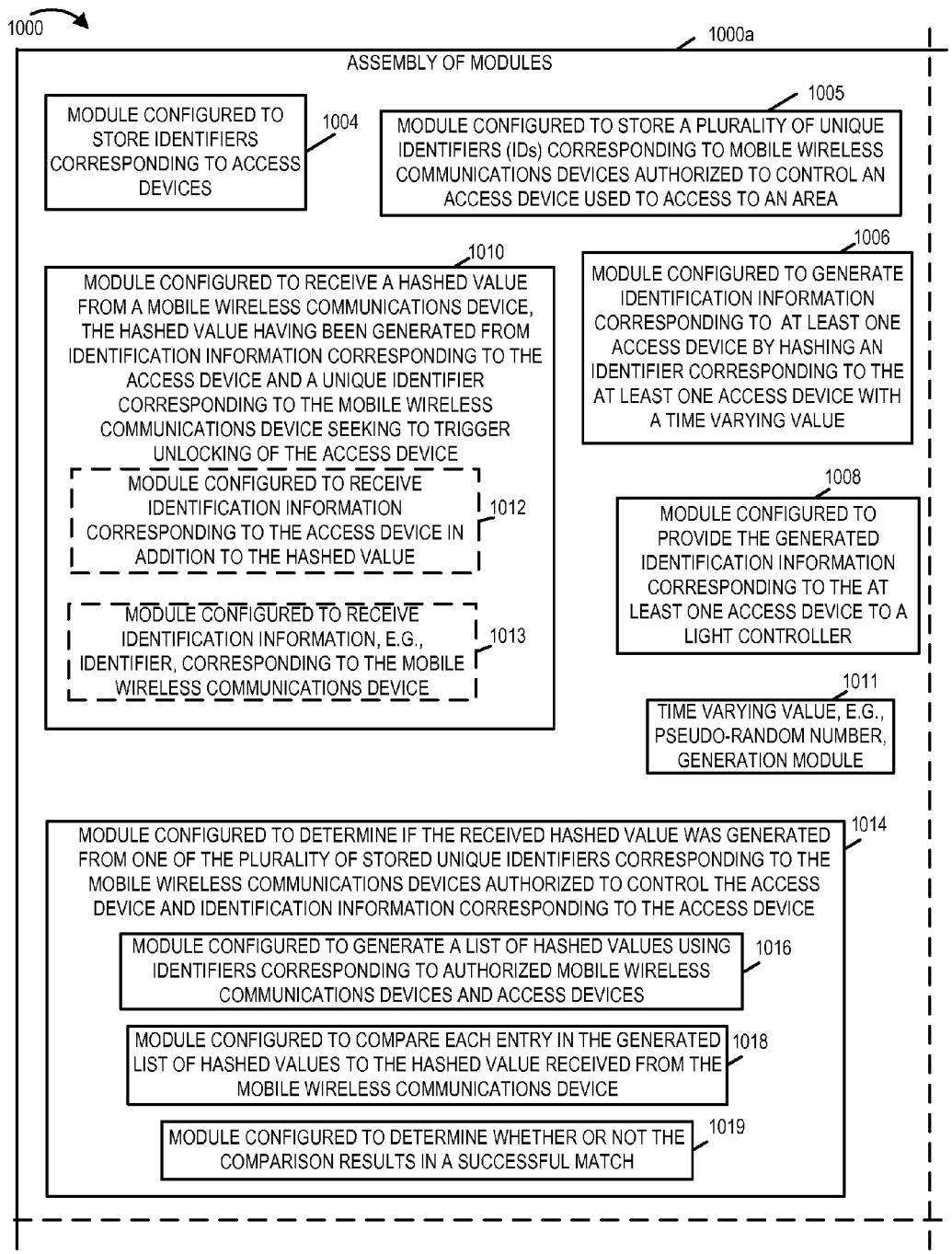
FIG. 10A is a first portion of an assembly of modules which can, and in some embodiments is, used in the exemplary access authorization device illustrated in FIG. 9.
Figure 10B:
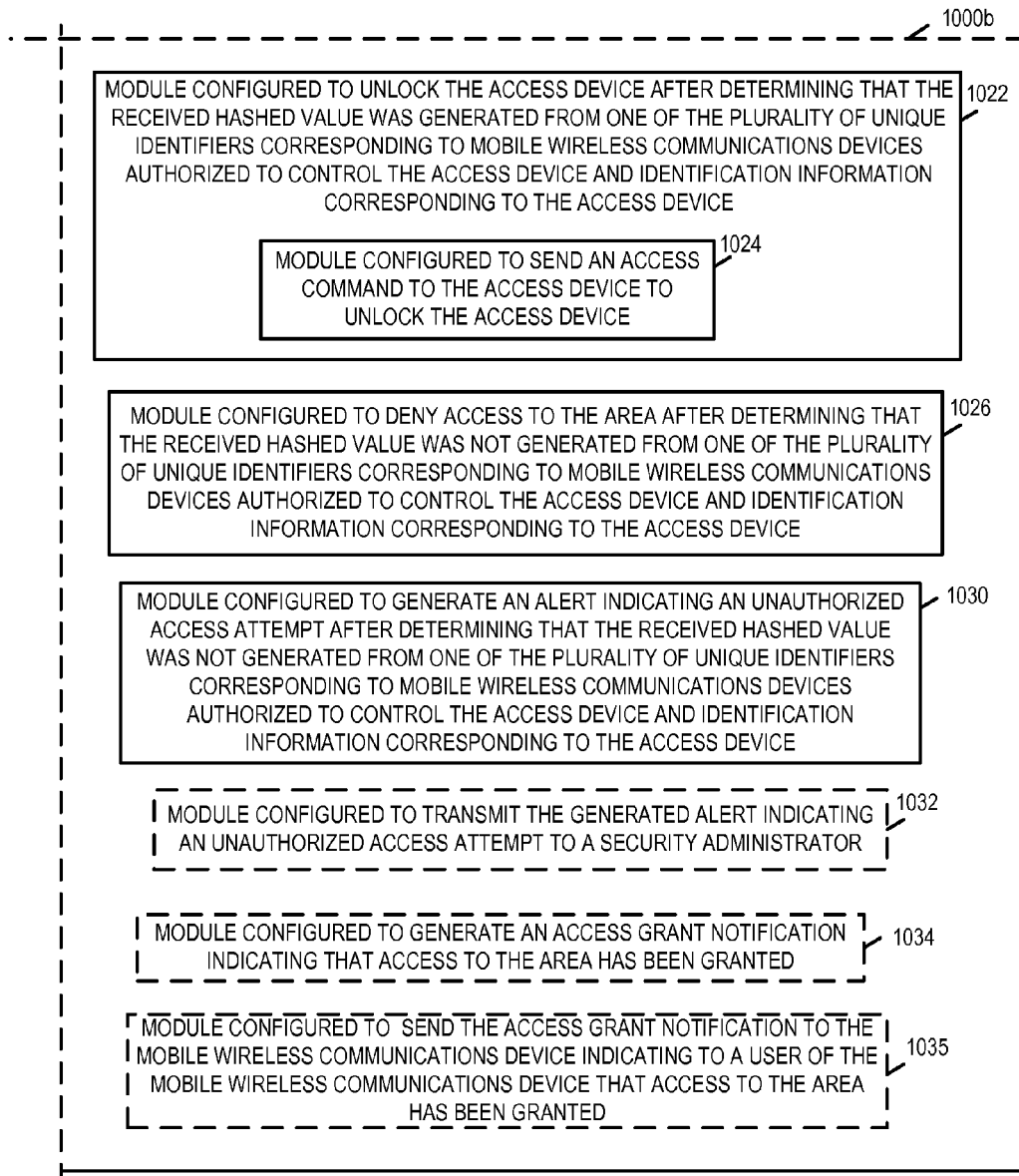
FIG. 10B is a second portion of an assembly of modules which can, and in some embodiments is, used in the exemplary access authorization device illustrated in FIG. 9.

FIG. 10 which comprises a combination of FIGS. 10A and 10B, illustrates an assembly of modules 1000 including a first portion 1000*a* shown in FIG. 10A and a second portion 1000*b* shown in FIG. 10B which can, and in some embodiments is, used in the access authorization device 900 illustrated in FIG. 9. The modules in the assembly 1000 can, and in some embodiments are, implemented fully in hardware within the processor 902, e.g., as individual circuits. In other embodiments some of the modules are implemented, e.g., as circuits, within the processor 902 while other modules being implemented, e.g., as circuits, external to and coupled to the processor. As should be appreciated the level of integration of modules on the processor and or with some modules being external to the processor may be one of design choice. Alternatively, rather than being implemented as circuits, all or some of the modules may be implemented in software and stored in the memory 904 of access authorization device 900 shown in FIG. 9 with the modules controlling operation of the access authorization device 900 to implement the functions corresponding to the modules when the modules are executed by a processor, e.g., processor 902. In still other embodiments, various modules are implemented as a combination of hardware and software, e.g., with a circuit external to the processor 902 providing input to the processor 902 which then under software control operates to perform a portion of a module's function.

While shown in the FIG. 9 embodiment as a single processor 902, e.g., computer, within device 900, it should be appreciated that processor 902 may be implemented as one or more processors, e.g., computers. When implemented in software, the modules include code, which when executed by the processor, configure the processor, e.g., computer, to implement the function corresponding to the module. In some embodiments, processor 902 is configured to implement each of the modules of the assembly of modules 1000. In embodiments where the assembly of modules 1000 is stored in memory 904, and the memory 904 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the access authorization device 900 or elements therein such as the processor 902 to perform the functions of the corresponding steps illustrated and/or described in the method of flowchart 800 of FIG. 8.

Assembly of modules 1000 includes a module 1004 configured to store, e.g., in the memory 904, identifiers corresponding to access devices, e.g., access device IDs corresponding to various access devices, a module 1005 configured to store a plurality of unique identifiers (IDs) corresponding to mobile wireless communications devices authorized to control an access device used to control access to an area, a module 1006 configured to generate identification information corresponding to at least one access device, e.g., AD1 112, by hashing an identifier corresponding to the at least one access device with a time varying value, and a module 1008 configured to provide, e.g., communicate, the generated identification information corresponding to the at least one access device to a light controller via a power line. In some embodiments the module 1008 is configured to provide the generated identification information corresponding to the at least one access device to a light controller via one a power line, a wireless signal, an Ethernet or a digital addressable light interface (DALI).

The assembly of modules 1000 in some embodiments further includes a module 1010 configured to receive a hashed value (e.g., an H2 value) from a mobile wireless communications device, the hashed value having been generated from identification information corresponding to the access device (e.g., H1 value) and a unique ID corresponding to the mobile wireless communications device seeking to trigger unlocking of the access device, a time varying value generation module 1011 configured to generate a time varying value, and a module 1014 configured to determine if the received hashed value (H2 value) was generated from one of the plurality of stored unique identifiers corresponding to the mobile wireless devices authorized to control the access device and identification information corresponding to the access device, e.g., such as $H1_{AD1}$ value corresponding to AD1 112. In some embodiments the module 1010 includes a module 1012 configured to receive identification information corresponding to the access device from the mobile communications device and a module 1013 configured to receive identification information corresponding to the mobile wireless communications device, e.g., mobile device identifier. Thus in some embodiments the access authorization device 900 receives identification information, e.g., H1 value, corresponding to the access device and the mobile communications device's identifier, in addition to the hashed value generated by the mobile communications device.

In some embodiments the module 1014 includes a module 1016 configured to generate a list of hashed values using the identifiers corresponding to mobile wireless devices authorized to control the access device and identification information corresponding to the access devices, e.g., hashed access device ID values stored in the access authorization device 900, a module 1018 configured to compare each entry of the generated list of hashed values to the bits of the hashed value received from the mobile communications device, and a module 1019 configured to determine/decide based on the comparison if the received hashed value (H2) matches a hashed value in the list of hashed values generated by module 1016.

In some embodiments when the access authorization device receives from the mobile communications device both the hashed value (e.g., H2) generated by the mobile wireless device and the identification information (e.g., H1 value) corresponding to the access device, the module 1016 is configured to generate the list of hashed values using (i) the received identification information (H1 value) corresponding to the access device and (ii) stored mobile device identifiers corresponding to mobile devices that are authorized to access the access device to which the received identification information corresponds.

In some embodiments where the access authorization device further receives the identifier of the mobile communications device requesting access, the module 1016 is configured to generate the list of hashed values using the received mobile device identifier and the identification information corresponding to the access device. In such a case the module 1016 is configured to generate the hashed value list by hashing the received identification information corresponding to the mobile communications device and the identification information (H1 value) corresponding to the access device.

In some embodiments when the hashed value (e.g., H2) generated by the mobile wireless device is received but the identification information corresponding to the access device (H1) and the mobile device identifier requesting access is not received, the module 1016 is configured to generate the list of H2 values using (i) various stored mobile device identifiers corresponding to authorized mobile devices and (ii) stored identification information corresponding to various access devices.

In various embodiments the assembly of modules 1000 further includes a module 1022 configured to unlock the access device when it is determined that the received hashed value (H2) was generated from one of the plurality of stored unique identifiers corresponding to mobile wireless communications devices authorized to control the access device and identification information (H1 value) corresponding to the access device. In some embodiments the module 1022 includes a module 1024 configured to send an access command, e.g., such as command 129, to the access device to unlock the access device. The access command may be sent over a wired or wireless link.

In various embodiments the assembly of modules 1000 further includes a module 1026 configured to deny the mobile communications device access to the area when it is determined that the received hashed value (H2) was not generated from one of the stored plurality of unique identifiers corresponding to mobile wireless communications devices authorized to control the access device and identification (H1) corresponding to the access device, a module 1030 configured to generate an alert indicating an unauthorized access attempt when it is determined that the received hashed value (H2) was not generated from one of the stored plurality of unique identifiers corresponding to mobile wireless communications devices authorized to control the access device and identification information (H1) corresponding to the access device, and a module 1032 configured to transmit the generated alert indicating an unauthorized access attempt to a security administrator or another authority responsible for security of the area, e.g., wirelessly via a wireless radio module or over a wired link via a wired interface. In some embodiments, the module 1032 is configured to present the generated alert, e.g., as an audio alarm and/or a message on a display device associated with the access authorization device 900 in order to notify an administrator/access authorization device operator.

In some embodiments the assembly of modules 1000 further includes a module 1034 configured to generate an access grant notification signal indicating that access to the area is granted, and a module 1035 configured to send the access grant notification to the mobile communications device indicating to a user of the mobile device that access to the area is granted.

FIG. 11 illustrates a table 1100 including access information which may be, and in some embodiments is, used by an access authorization device for authenticating one or more mobile wireless communications devices attempting to control access devices to access an area in accordance with some exemplary embodiments. The table 1100 in some embodiments is stored in the access authorization device, e.g., device 900. In some embodiments the table 1100 including access information is stored in an external database. In some embodiments the access authorization device includes table 1100 in addition the information table 300 of FIG. 3. In some other embodiments table 1100 includes, in addition to the information shown in FIG. 11, the additional information shown in table 300 but which is not shown in FIG. 11 example, e.g., information regarding representative lighting devices corresponding to the access devices identified by the entries in column 1102.

Table 1100 includes information regarding access devices and mobile communications devices that are authorized to control various devices in the system. In table 1100, each entry in column 1102 indicates an access device name/number, e.g., door number or room name, with each of the rows 1120, 1122, . . . , 1128 corresponding to an individual access device indicated in column 1102. Thus row 1120 corresponds to AD1, row 1122 corresponds to AD2, . . . , and row 1128 corresponds to AD X($X^{th}$ access device). Each entry in column 1104 indicates an access device identifier, e.g., MAC ID or another identifier, corresponding to the access device indicated in the corresponding entry in column 1102.

Column 1106 indicates access ID hashed values (referred as H1 values) and corresponding validity time periods corresponding to each access device identified by an identifier in a corresponding entry in column 1104. Column 1106 is sub-divided into two columns 1108 and 1110. Each entry in sub-division column 1108 indicates an access ID hashed value corresponding to the access device identifier identified in the corresponding entry in column 1104 while each entry in the sub-division column 1110 indicates a corresponding validity time period for which the corresponding hashed access ID value is valid. In the example of FIG. 11, only two hashed access ID values and their corresponding validity time periods are shown for each access device identifier shown in the corresponding entry in column 1104, however it should be appreciated that a plurality of hashed access ID values are generated for each access device in some embodiments.

Next in column 1112 authorized mobile communications devices are identified. Each entry, e.g., M1, M2 etc., in column 1112 indicates an identifier (MID) corresponding to a mobile communications device that is authorized to control the access device identified in the corresponding entry of column 1102, e.g., to access an area. As should be appreciated from the table 1100 there may be a plurality of mobile communications devices identified by their corresponding identifiers that are authorized to access an access device such as AD1, AD2 etc. It is possible that different mobile communications devices have authorization to control different access devices. Thus all the mobile communications devices that are authorized to access AD1 may not necessarily be authorized to access AD2 or another access device. As illustrated in column 1112 the mobile communications devices identified by identifiers M1, M2, . . . , ML corresponds to a set of L mobile communications devices authorized to access AD1. The mobile communications devices identified by identifiers M1, M2, . . . , MP corresponds to a set of P mobile communications devices authorized to access AD2. Similarly it is illustrated that the mobile communications devices identified by identifiers M1, M2, . . . , MY correspond to a set of Y mobile communications devices authorized to access the access device AD X.

Next in column 1114 hashed values (H2 values), generated by hashing an access ID hashed value (H1) and a mobile device identifier (MID), are shown. Thus each entry in column 1114 indicates a hashed value generated using an access ID hashed value (H1) in the corresponding entry in column 1108 and a mobile device identifier (MID) indicated in the corresponding entry in column 1112. For example, the first hashed value entry in column 1114 "$H2_{M1D1}$" is generated by hashing the access ID hashed value "$H1_{AD1}$" corresponding to access device AD1 and the mobile device identifier "M1" corresponding to a mobile communications device.

To understand how the information in table 1100 is used in authentication of mobile communications devices sending access request to an access authorization device and how different hashed values are generated, consider the first row 1120 and the first entry in each of the columns 1102, 1104,

1106, 1112 and 1114. For access device AD1, the first entry in column 1104 identifies the identifier "00:19:47:FF:1D:2E" corresponding to the AD1. The first entry in column 1108 "$H1_{AD1}$" is the access ID hashed value generated by the access authorization server in the manner discussed in FIG. 2 example in detail, e.g., by XORing the access device identifier with a time varying value (e.g., a first pseudo-random number) and then hashing the output. The first entry in column 1110 indicates the time period T1 for which the access ID hashed value "$H1_{AD1}$" is valid. Upon expiration of the time period T1, the "$H1_{AD1}$" value is no longer considered valid by the access authorization server in some embodiments. The second entry in column 1108 "$H1'_{AD1}$" is the access ID hashed value generated by the access authorization server in the same manner using the same access device identifier corresponding to AD1 and a time varying value, e.g., a second pseudo-random number. The hashed access ID values with a prime (') are valid for the second time period T2.

In accordance with one aspect of some embodiments when an access authorization device receives an access request including the hash value (H2) from a mobile communications device attempting access to an area, the access authorization server generates a list of H2 values on its own using the access ID hashed values (H1 values). The access authorization device then compares the received hashed H2 value in the access request with the H2 values in the generated list such as shown in column 1114. If the received hashed value matches with a hashed value in the generated list, the requesting mobile communications device is granted access.

For example, the first hashed value entry in column 1114 "$H2_{M1D1}$" is generated by hashing the access ID hashed value "$H1_{AD1}$" corresponding to access device AD1 and the mobile device identifier "M1" corresponding to a mobile communications device. Hashed value "$H2_{M2D1}$" is generated by hashing the access ID hashed value "$H1_{AD1}$" corresponding to AD1 and the mobile device identifier "M2". Hashed value "$H2'_{M1D1}$" is generated by hashing the access ID hashed value "$H1'_{AD1}$" corresponding to AD1 valid for time period T2 and the mobile device identifier "M1". Similarly "$H2_{M1D2}$" is generated by hashing the access ID hashed value "$H1_{AD2}$" corresponding to access device AD2 and the mobile device identifier "M1", the hashed value "$H2_{MPD2}$" is generated by hashing the access ID hashed value "$H1_{AD2}$" and the mobile device identifier "MP", . . . , the hashed value "$H2'_{MYDX}$" is generated by hashing the access ID hashed value "$H1'_{ADX}$" corresponding to access device AD X valid for time period T2 and the mobile device identifier "MY". Thus column 1114 includes a list of hashed values (H2 values) generated by the access authorization server using the mobile device identifiers (M IDs) and access device ID hashed values (H1 values).

Consider for example that a first mobile communications device having the identifier "M1" seeks to access an area by unlocking access device AD1. In one embodiment the first mobile communications device generates a hashed value using its identifier "M1" and a hashed access device ID value (H1) corresponding to AD1 that the first mobile device received via a VLC signal as discussed in detail earlier. For the purposes of discussion consider that the hashed access device ID value received by the mobile device is "$H1_{AD1}$". Using the identifier "M1" and "$H1_{AD1}$" the mobile communications device generates a hashed (H2) value=$H2_{M1D1}$ and communicates this value to the access authorization device, e.g., in an access request message. Further consider that the mobile device also sends the access ID hashed value "$H1_{AD1}$" along with the "$H2_{M1D1}$" value in the access request message (although this is not necessary in all embodiments). When the access authorization device receives the "$H2_{M1D1}$" and "$H1_{AD1}$", it determines that the access device for which the access request in intended is AD1. Therefore the access authorization device generates a list of H2 values using the received access ID hashed value "$H1_{AD1}$" and stored mobile device identifiers corresponding to the devices which are authorized to control access device AD1, e.g., devices M1, M2, . . . , ML. In this example, the generated list includes values $H2_{M1D1}$, $H2_{M2D1}$, . . . , and $H2_{MLD1}$ shown in column 1114 and corresponding row 1120. Next the access authorization device compares the hashed value "$H2_{M1D1}$" received in the access request message from the mobile communications device with the values in the generated list and determines that there is a match. Accordingly, the access authorization device sends a control command to a controller corresponding to the AD1 to unlock the access device AD1 and the mobile communications device is granted access.

Thus in some embodiments, in the manner discussed above, the access authorization device determines whether a mobile communications device requesting access should be granted access or denied.

In accordance with some embodiments, a mobile communications device, e.g., smart phone, equipped with a camera is used as the receiver and the LED-based lighting infrastructure is used as the transmitter of a signal that is used to perform access authorization. LED-based lighting is becoming the predominant mode of lighting in many commercial and retail buildings. Various features of the described methods and apparatus utilize low-rate visible light communication signals transmitted by LED luminaires used for lighting for communicating information that can be used by authorized mobile communications devices to control an access device, e.g., a door, to access an area.

In accordance with an aspect of some embodiments, in an exemplary system a LED luminaire is installed in the physical neighborhood of an entry point, e.g., access device such as a door to a conference room inside an office building. In one embodiment, the building has a Wi-Fi wireless network and an access authorization device, e.g., server, which are used to receive and process, respectively, access requests from the mobile devices which are also equipped with a Wi-Fi modem. The mobile device may have additional modems, e.g., WAN modem and/or another modem. In some other embodiments, the wireless network is WAN-based and the access authorization server is remotely located. In such embodiments, the mobile device has a WAN modem. In various embodiments the mobile device is equipped with at least one of a camera or a specialized VLC receiver.

Once method for securing building access in accordance with an exemplary embodiment can be described as follows:

The LED luminaire transmits a visible light communication (VLC) signal that carries identification information corresponding to the doors in the vicinity of the luminaire. The identification information is hashed using a time-varying hash function known only to the access authorization server. If the VLC transmission were constant over time, there could be a potential for spoofing: i.e., devices which have decoded the ID once can store it and use it to control the door from any location and any time (e.g., as long as they have access to the server). In one embodiment, the hash function is randomized over time. One way in which this can be accomplished is by XORing the door ID with a pseudo-random number and using that as the input to the hash function. In this way, even if a user records the hashed ID, they will not be able to use it at another time to open the door without receiving the latest hash information from the VLC signal transmitted by the luminaire near the door. A new hash may be generated on the time scale of human motion, for instance every ten seconds. The lighting controller modulates a VLC signal based on the hashed ID and broadcasts it periodically. The hash function output is denoted as H1(access ID, t) where the second argument is the time index t, indicating that the hash is a function of time.

In a typical building there may be hundreds of luminaires and dozens of access points (doors). In some embodiments only the luminaires that are in close proximity, e.g., a predetermined proximity, to the access points may be selected and configured to transmit the VLC signal. Thus in some embodiments unique access IDs are assigned to those access points and transmitted by their representative luminaries. The access IDs may be globally unique (such as a MAC address) or unique within the scope of the building. The access authorization server determines the list of access IDs and maintains it. In some embodiments each luminaire can be individually controlled to transmit independent messages. In some embodiments this can be accomplished in a straightforward way by a dedicated DC-powered lighting infrastructure system in which case the signal (carrying the H1 bits) is sent along a power cable that it is connected to luminaire which then generates a VLC signal from the received power signal with the VLC signal including the information modulated on the supplied power signal. In such embodiments it is the task of the lighting controller to determine which data to send to which luminaires by selecting to transmit the data on the appropriate power supply cable, i.e., the power supply cable supplying power to the particular luminaire intended to transmit the information. In some other embodiments, a luminaire may receive data from a PLC line which serves multiple devices in which case a digital PLC signal decoder may be included in and used by the luminaire. In some such embodiments the transmitter is a power line communication router, e.g., a Hy-Fi router, and each luminaire has its own unique MAC address. The use of the luminaire's MAC address allows the PLC line to be shared by luminaires in the system which can distinguish between packets directed to them and packets directed to other devices based on their MAC address. In one such embodiment, the power line communications (PLC) router sends a message to a particular luminaire by appending the particular luminaire's MAC address to the preamble of a packet that the message is sent in. Only the luminaire with the matching MAC address decodes the given packet, decodes the message, e.g., hashed access device identifier to be transmitted, and re-modulates it into a VLC signal.

A lighting controller may communicate to the LED luminaire using a number of technologies such as:

Power line communications (PLC);

dedicated DC wiring. This type of system is likely going to be the predominant method of power and control for LED systems going forward.

Ethernet, which can also be used to power the LED using PoE (Power over Ethernet) technology;

DALI (Digital addressable light interface) which is a networking protocol for controlling lighting.

The mobile device receiver detects the VLC signal and decodes the hashed ID bits H1. The mobile is not able to recover the original access ID. Instead, the mobile transmits the received hashed ID over a Wi-Fi (or WAN) link to the access authorization server that is sitting either on the LAN connected to the router or is accessible from the external WAN network (e.g., via VPN for instance). Along with the hashed access ID, the mobile also transmits a hash of its unique ID, such as the user's name or employee number. We will call this the mobile ID. More precisely, the hash function output is H2 (mobile ID XOR H1). In this way, the mobile ID is never transmitted over the air directly so the risk of identity spoofing is minimized. The hash bits H1 may not need to be transmitted. However, in this case, the task of the server is more complex because it would have to generate H2 for every possible hash value H1 corresponding to every access points (doors) in the building. Not transmitting H1 would be marginally more secure because it would prevent spoofing by mobiles which are not VLC-enabled but which have somehow determined the mobile ID of an authorized user (an unlikely scenario).

In some embodiments the access authorization device receives from the mobile both the hashed access ID H1 and the hashed mobile ID H2. The access authorization device has a list of authorized mobile communications devices and a list of H1 values for each access device (such as a door) in the system known to the access authorization device. In some embodiments as soon as it receives H1, it is able to tell for which door the access request is intended. To determine which mobile is sending the request, it computes a list of hash function outputs H2 (mID XOR H1) for all the mobile IDs "mID" in its list of authorized mobiles and compares each entry of the list to the hashed bits H2 that it receives from the mobile. If there is a match is the mobile communications device is allowed access. In some embodiments in such a case a command is sent to the individual access device controller to allow access.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

Numerous variations on the above described methods and apparatus are possible. For example, in accordance with an aspect of some embodiments, in an exemplary system a lighting device, e.g., an LED luminaire, is installed in the physical neighborhood of an entry point, e.g., access device such as a door to a conference room inside an office building or at another point of entry. In various embodiments the LED luminaire transmits a VLC signal that carries identification information corresponding to the access device in the vicinity of the luminaire. The luminaire may be positioned over and/or in front of the door thereby illuminating the door which can provide access to a secure area. In a typical building there may be hundreds of lighting devices and dozens of access points (e.g., doors), however, in accordance with one aspect of some embodiments, a single lighting device that is in close proximity, e.g., a predetermined proximity, to an access point may be selected and configured to transmit the VLC signals which provide information used to gain access via the corresponding access device which serves as an ingress or egress point to a secure area. In various embodiments unique access IDs are assigned to those access devices and transmitted by their representative, e.g., corresponding, luminaires. Thus, in at least some embodiments and access ID corresponds to both the door and the luminaire associated with the door that transmits the access ID or time varying version, e.g., hashed version, of the access ID. The access IDs may be globally unique (such as a MAC address) or unique within the scope of the building. In some embodiments an access authorization device, e.g., server, determines the list of access IDs and maintains it. In some embodiments the identification information (carried by the transmitted VLC signal) is hashed by the access authorization device using a time-varying hash function known to the access authorization server. In some embodiments the hashed identification information is provided to a lighting controller.

In some embodiments each luminaire can be individually controlled, e.g., by the lighting controller, to transmit independent messages, e.g., carrying access device identification information. In some embodiments the lighting controller modulates a VLC signal based on the hashed identification information and broadcasts it, e.g., periodically, to thereby communicate the hashed identification information. The hash function output is denoted as H1 (access ID, t) where the second argument is the time index t, indicating that the hash is a function of time.

In various embodiments the mobile device receiver detects the VLC signal and decodes the hashed ID bits. In some embodiments the mobile communications device is not able to recover the original access ID. Instead, the mobile transmits the received hashed ID, e.g., over a Wi-Fi or WAN communications link, to the access authorization server that may be sitting either on the LAN connected to a router or is accessible from an external WAN network. Along with the hashed access ID, the mobile in some embodiments also transmits a hash of a unique identifier (ID) corresponding to the mobile communications device. The unique ID may be, e.g., mobile device user's name, employee number, mobile device's identifier etc. The unique ID corresponding to the mobile communications device is generally referred to as mobile ID. In some embodiments the hash function output is H2 (mobile ID XOR H1). In some embodiments the mobile ID is not transmitted over the air directly so the risk of identity spoofing is minimized. The hash bits H1 may not be, and in some embodiments are not, transmitted. However, in this case, the task of the access authorization server is more complex because it would have to generate H2 for every possible hash value H1 corresponding to every access point (e.g., doors) in the building. Not transmitting H1 is marginally more secure because it prevents spoofing by mobile devices which are not VLC enabled but which have somehow determined the identifier corresponding to the mobile device of an authorized user.

The access authorization device receives from the mobile device the hashed mobile ID (H2) and additionally in some embodiments also receives the hashed access device ID. In various embodiments the access authorization device has a list of authorized mobiles and a list of H1 values for each access device in the system. Once it receives H1 value, the access authorization device is able to tell for which door the access request is intended. To determine which mobile is sending the request, the access authorization device, in some embodiments, computes a list of hash function outputs (H2 values). In some embodiments the hash function output is computed by XORing the mobile ID with the hashed access ID (e.g., mobile ID XOR H1) for all the mobile devices in its list of authorized mobile devices. The H2 value received from the mobile communications device is compared with each entry in the generated list. In various embodiments if there is a match the mobile device is allowed access. In some such embodiments a command is sent to an individual access device controller to allow access. In various embodiments if the match is not successful, the mobile device is denied access to the area. In some embodiments if the match is not successful, an alert indicating an unauthorized access attempt is generated and communicated to a security administrator.

In some embodiments, the building has a Wi-Fi wireless network and the access authorization device receive access requests from the mobile communications devices which are equipped with a Wi-Fi modem over the Wi-Fi wireless network. The mobile device may have additional modems, e.g., WAN modem and/or another modem. In some other embodiments, the wireless network is WAN-based and the access authorization server is remotely located. In such embodiments, the mobile device has a WAN modem.

The techniques of various embodiments may be implemented using software, hardware and/or a combination of software and hardware. Various embodiments are directed to apparatus, e.g., stationary nodes and/or mobile nodes such as mobile terminals supporting wireless communications, access points such as base stations, and/or communications systems. Various embodiments are also directed to methods, e.g., method of controlling and/or operating stationary nodes, mobile nodes, access points, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal receiving, processing, signal generation, and/or transmission steps. Thus, in some embodiments various features are implemented using modules. Such modules may be implemented using software, hardware or a combination of software and hardware. In some embodiments the modules are circuits. Thus at least in some embodiments a module is a circuit for performing the function corresponding to the module.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol. Various embodiments are well suited for communications in indoor environments.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In some embodiments, a wireless communications device, e.g., a mobile node, which implements a method, is embedded in a vehicle. In various embodiments the mobile nodes are implemented as notebook computers, personal data assistants (PDAs), or other portable devices including receiver/transmitter circuits and logic and/or routines, for implementing the methods.

What is claimed is:

1. A method of operating an access authorization device, said method comprising:

storing a plurality of unique identifiers corresponding to mobile wireless communications devices authorized to control an access device used to control access to an area;

providing identification information corresponding to said access device to a light emitting device by way of a power line network;

receiving a first hashed value from a mobile wireless communications device, said first hashed value having been generated from said identification information corresponding to said access device and a unique identifier corresponding to said mobile wireless communications device seeking to trigger unlocking of said access device;

receiving, from said mobile wireless communications device, said unique identifier corresponding to said mobile wireless communications device;

generating a second hashed value by hashing said unique identifier corresponding to said mobile wireless communications device with said identification information corresponding to said access device;

determining if said first hashed value was generated from one of said mobile wireless communications devices authorized to control said access device based at least in part on determining if said second hashed value matches said first hashed value; and sending an access command for unlocking said access device after determining that said first hashed value was generated from one of said mobile wireless communications devices authorized to control said access device.

2. The method of claim 1, further comprising:

denying access to said area after determining that said first hashed value was not generated from one of said plurality of unique identifiers corresponding to mobile wireless communications devices authorized to control said access device and said identification information corresponding to said access device.

3. The method of claim 2, further comprising:

generating an alert indicating an unauthorized access attempt after determining that said first hashed value was not generated from one of said plurality of unique identifiers corresponding to mobile wireless communications devices authorized to control said access device and said identification information corresponding to said access device.

4. The method of claim 1, further comprising:
generating said identification information corresponding to said access device by hashing an identifier corresponding to said access device with a time varying value.

5. An access authorization device, comprising:
means for storing a plurality of unique identifiers corresponding to mobile wireless communications devices authorized to control an access device used to control access to an area;
means for providing identification information corresponding to said access device to a light emitting device by way of a power line network;
means for receiving a first hashed value from a mobile wireless communications device, said first hashed value having been generated from said identification information corresponding to said access device and a unique identifier corresponding to said mobile wireless communications device seeking to trigger unlocking of said access device;
means for receiving, from said mobile wireless communications device, said unique identifier corresponding to said mobile wireless communications device;
means for generating a second hashed value by hashing said unique identifier corresponding to said mobile wireless communications device with said identification information corresponding to said access device;
means for determining if said first hashed value was generated from one of said mobile wireless communications devices authorized to control said access device based at least in part on determining that said second hashed value matches said first hashed value; and
means for sending an access command for unlocking said access device after determining that said first hashed value was generated from one of said mobile wireless communications devices authorized to control said access device.

6. The access authorization device of claim 5, further comprising:
means for denying access to said area after said means for determining determines that said first hashed value was not generated from one of said plurality of unique identifiers corresponding to mobile wireless communications devices authorized to control said access device and said identification information corresponding to said access device.

7. The access authorization device of claim 6, further comprising:
means for generating an alert indicating an unauthorized access attempt after said means for determining determines that said first hashed value was not generated from one of said plurality of unique identifiers corresponding to mobile wireless communications devices authorized to control said access device and said identification information corresponding to said access device.

8. The access authorization device of claim 5, further comprising:
means for generating said identification information corresponding to said access device by hashing an identifier corresponding to said access device with a time varying value.

9. An access authorization device, comprising:
a memory; and
at least one processor configured to:
store, in said memory, a plurality of unique identifiers corresponding to mobile wireless communications devices authorized to control an access device used to control access to an area;
provide identification information corresponding to said access device to a light emitting device by way of a power line network;
receive a first hashed value from a mobile wireless communications device, said first hashed value having been generated from said identification information corresponding to said access device and a unique identifier corresponding to said mobile wireless communications device seeking to trigger unlocking of said access device;
receive, from said mobile wireless communications device, said unique identifier corresponding to said mobile wireless communications device;
generate a second hashed value by hashing said unique identifier corresponding to said mobile wireless communications device with said identification information corresponding to said access device;
determine if said first hashed value was generated from one of said mobile wireless communications devices authorized to control said access device based at least in part on determining that said second hashed value matches said first hashed value; and
send an access command to unlock said access device after determining that said first hashed value was generated from one of said mobile wireless communications devices authorized to control said access device.

10. The access authorization device of claim 9, wherein said at least one processor is further configured to deny access to said area after determining that said first hashed value was not generated from one of said plurality of unique identifiers corresponding to mobile wireless communications devices authorized to control said access device and said identification information corresponding to said access device.

11. The access authorization device of claim 10, wherein said at least one processor is further configured to generate an alert indicating an unauthorized access attempt after determining that said first hashed value was not generated from one of said plurality of unique identifiers corresponding to mobile wireless communications devices authorized to control said access device and said identification information corresponding to said access device.

12. A computer program product for use in an access authorization device, the computer program product comprising:
a non-transitory computer readable medium comprising:
code for causing at least one computer to store a plurality of unique identifiers corresponding to mobile wireless communications devices authorized to control an access device used to control access to an area;
code for causing said at least one computer to provide identification information corresponding to said access device to a light emitting device by way of a power line network;
code for causing said at least one computer to receive a first hashed value from a mobile wireless communications device, said first hashed value having been generated from said identification information corresponding to said access device and a unique identifier corresponding to said mobile wireless communications device seeking to trigger unlocking of said access device;

code for causing said at least one computer to receive, from said mobile wireless communications device, said unique identifier corresponding to said mobile wireless communications device;

code for causing said at least one computer to generate a second hashed value by hashing said unique identifier corresponding to said mobile wireless communications device with said identification information corresponding to said access device;

code for causing said at least one computer to determine if said first hashed value was generated from one of said mobile wireless communications devices authorized to control said access device based at least in part on determining that said second hashed value matches said first hashed value; and code for causing said at least one computer to send an access command to unlock said access device after determining that said first hashed value was generated from one of said mobile wireless communications devices authorized to control said access device.

13. The access authorization device of claim 9, wherein said at least one processor is further configured to generate said identification information corresponding to said access device by hashing an identifier corresponding to said access device with a time varying value.

14. The computer program product of claim 12, wherein said non-transitory computer readable medium further comprises:

code for causing said at least one computer to deny access to said area after determining that said first hashed value was not generated from one of said plurality of unique identifiers corresponding to mobile wireless communications devices authorized to control said access device and said identification information corresponding to said access device.

15. The computer program product of claim 14, wherein said non-transitory computer readable medium further comprises:

code for causing said at least one computer to generate an alert indicating an unauthorized access attempt after determining that said first hashed value was not generated from one of said plurality of unique identifiers corresponding to mobile wireless communications devices authorized to control said access device and said identification information corresponding to said access device.

16. The computer program product of claim 12, wherein said non-transitory computer readable medium further comprises:

code for causing said at least one computer to generate said identification information corresponding to said access device by hashing an identifier corresponding to said access device with a time varying value.

* * * * *